(12) United States Patent
Sharma et al.

(10) Patent No.: US 11,556,346 B2
(45) Date of Patent: Jan. 17, 2023

(54) SECURITY ENHANCEMENT IN HIERARCHICAL PROTECTION DOMAINS

(71) Applicant: QUALCOMM Incorporated, San Diego, CA (US)

(72) Inventors: Naresh Kumar Sharma, Hyderabad (IN); Saurabh Gorecha, Hyderabad (IN); Pravin Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/897,959

(22) Filed: Jun. 10, 2020

(65) Prior Publication Data

US 2021/0389953 A1    Dec. 16, 2021

(51) Int. Cl.

| | | |
|---|---|---|
| *G06F 9/38* | (2018.01) | |
| *G06F 9/48* | (2006.01) | |
| *G06F 9/30* | (2018.01) | |
| *G06F 9/32* | (2018.01) | |
| *G06F 9/54* | (2006.01) | |
| *G06F 21/60* | (2013.01) | |

(Continued)

(52) U.S. Cl.
CPC ........ *G06F 9/3861* (2013.01); *G06F 9/30036* (2013.01); *G06F 9/30076* (2013.01); *G06F 9/321* (2013.01); *G06F 9/4812* (2013.01); *G06F 9/542* (2013.01); *G06F 12/1491* (2013.01); *G06F 21/602* (2013.01); *G06F 21/78* (2013.01)

(58) Field of Classification Search
CPC .................................................. G06F 9/3861
See application file for complete search history.

(56) References Cited

U.S. PATENT DOCUMENTS

| | | | |
|---|---|---|---|
| 9,465,617 B1* | 10/2016 | Warkentin | .......... G06F 9/30145 |
| 2003/0037089 A1* | 2/2003 | Cota-Robles | ....... G06F 11/3466 |
| | | | 718/1 |

(Continued)

FOREIGN PATENT DOCUMENTS

JP    2018036695 A    3/2018

OTHER PUBLICATIONS

International Search Report and Written Opinion—PCT/US2021/032665—ISA/EPO—dated Jul. 21, 2021 15 pages.

(Continued)

*Primary Examiner* — Michael J Metzger
(74) *Attorney, Agent, or Firm* — The Marbury Law Group

(57) ABSTRACT

Methods and systems for allowing software components that operate at a specific exception level (e.g., EL-3 to EL-1, etc.) to repeatedly or continuously observe or evaluate the integrity of software components operating at a lower exception level (e.g., EL-2 to EL-0) to ensure that the software components have not been corrupted or compromised (e.g., subjected to malware, cyberattacks, etc.) include a computing device that identifies, by a component operating at a higher exception level ("HEL component"), at least one of a current vector base address (VBA), an exception raising instruction (ERI) address, or a control and system register value associated with a component operating at a lower exception level ("LEL component"). The computing device may perform a responsive action in response to determining that the current VBA, the ERT address, or control and system register value do not match the corresponding reference data.

33 Claims, 14 Drawing Sheets

(51) Int. Cl.
G06F 21/78 (2013.01)
G06F 12/14 (2006.01)

(56) References Cited

U.S. PATENT DOCUMENTS

| | | | | |
|---|---|---|---|---|
| 2012/0042154 | A1* | 2/2012 | Grisenthwaite | G06F 9/30101 |
| | | | | 712/229 |
| 2016/0246604 | A1* | 8/2016 | Winrow | G06F 9/3804 |
| 2017/0220795 | A1 | 8/2017 | Suginaka | |
| 2020/0089918 | A1* | 3/2020 | Du | H04L 9/3239 |
| 2020/0409740 | A1* | 12/2020 | Li | G06F 21/44 |

OTHER PUBLICATIONS

Zheng X., et al., "TZ-KPM: Kernel Protection Mechanism on Embedded Devices on Hardware-Assisted Isolated Environment", 2016 IEEE 18th International Conference on High Performance Computing and Communications, IEEE 14th International Conference on Smart City, IEEE 2nd International Conference on Data Science and Systems (HPCC/SMARTCITY/DSS), IEEE, Dec. 12, 2016, pp. 663-670, XP033052458, DOI: 10.1109/HPCC-SMARTCITY-DSS.2016.0098 [retrieved on Jan. 20, 2017] Abstract Sections I-V.

* cited by examiner

SECURITY ENHANCEMENT IN HIERARCHICAL PROTECTION DOMAINS

BACKGROUND

Modern software systems are often split into multiple modules/components that each have a different level of privilege or access to the computing device's resources (e.g. system resources, processor resources, memory resources, etc.). An example of such a split is between the operating system (OS) kernel and user applications in which the user applications are given a much more limited level of access to system resources than the OS kernel.

To facilitate similar splits at the chip level, certain processors and computing architectures (e.g., ARM, RISC-V, Hexagon DSP, etc.) include features that support hierarchical protection domains and/or implement different levels of privilege. Such systems typically only operate at one level of privilege at a time, and the level of privilege ("current privilege level") may only be changed when the device processor takes or returns from an exception. For this reason, the privilege levels are commonly called exception levels (ELs). These exception levels may be numbered (e.g., EL-0 to EL-3) so that the higher levels of privilege have higher numbers. For example, software with the lowest levels of privilege (e.g., user applications, etc.) may operate at EL-0, whereas software with the highest levels of privilege (the system monitor, etc.) may operate at EL-3.

SUMMARY

Various aspects may include apparatuses and methods for evaluating software operating on a computing device at a lower exception level. Various aspects may include identifying, by a component operating at a higher exception level ("HEL component"), at least one of a current vector base address (VBA), an exception raising instruction (ERI) address, or a control and system register (CSR) value associated with a component operating at a lower exception level ("LEL component"), determining whether at least one of the current VBA, the ERI address, or the CSR value match corresponding reference data, and performing a responsive action in response to determining that the current VBA, the ERI address, or CSR value do not match the corresponding reference data.

Some aspects may further include scanning, by the HEL component, at least the lower exception level to collect data, labeling portions of the collected data as critical data that is to be used as reference data, generating hashes of the reference data, and storing the generated hashes as reference data in a portion of memory accessible to the HEL component but not to the LEL component. In such aspects, scanning, by the HEL component, at least the lower exception level to collect data may include the HEL component collecting LEL component data as reference data during loading of LEL the component.

Some aspects may further include identifying critical data currently in working memory, computing a hash of the identified critical data, and comparing the computed hash with the corresponding reference data to determine whether at least one of the current VBA, the ERI address, or the system register value match corresponding reference data. In such aspects, identifying critical data currently in working memory may include identifying critical read-execute (RX) code or critical read only (RO) data currently present in working memory, and comparing the computed hash with corresponding reference data may include comparing the computed hash with reference data hash stored in memory by HEL component.

Some aspects may further include invoking the HEL component periodically to verify that the integrity of the LEL component has not been compromised. Some aspects may further include invoking the HEL component non-periodically to verify that the integrity of the LEL component has not been compromised. Some aspects may further include invoking the HEL component periodically to verify that the integrity of the LEL component has not been compromised by invoking the HEL component based on at least one of: a machine interrupt with a cyclic executive trigger; a random machine interrupt with a pseudo random table-driven trigger; or a user triggered machine interrupt with an event-based trigger.

Some aspects may further include detecting a system call or runtime event that could cause a change in a current exception level of the computing device, and invoking the HEL component to verify that the integrity of the LEL component has not been compromised in response to detecting the system call or runtime event that could cause the change in the current exception level of the computing device.

In some aspects, identifying at least one of the current VBA, the ERI address, or the CSR value associated with the LEL component may include identifying the current VBA by performing one or more of: reading a vector base address register (VBAR); reading a vector table base holder; reading exception level vector base address register (ELx_VBAR), reading a machine trap value register (MTVAL); reading an event vector base (EVB); or equivalent provisions in hierarchical privilege level-based instruction set architectures.

In some aspects, identifying at least one of the current VBA, the ERI address, or the CSR value associated with the LEL component may include identifying the ERI address by capturing an address in the highest exception level from one of: a secure monitor call (SMC) code section; an exception link register (ELR); a machine exception program counter (MEPC); a program counter (PC) value for the instruction executed when the exception occurred; or a processor CSR.

In some aspects, determining whether at least one of the current VBA, the ERI address, or the CSR value match corresponding reference data may include using a reference data comparison set that includes a hash of a critical section; a VBA; a set of address ranges for ERI captured from an exception link register (ELR) or a machine exception program counter (MEPC); or a CSR value.

Various aspects include a computing device having a memory storing processor-executable instructions and a processor configured to execute the processor-executable instructions to perform operations of any of the methods summarized above. Various aspects include a processor for use in a computing device, the processor having memory and configured to perform operations of any of the methods summarized above. Various aspects include a non-transitory processor readable storage medium on which are stored processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
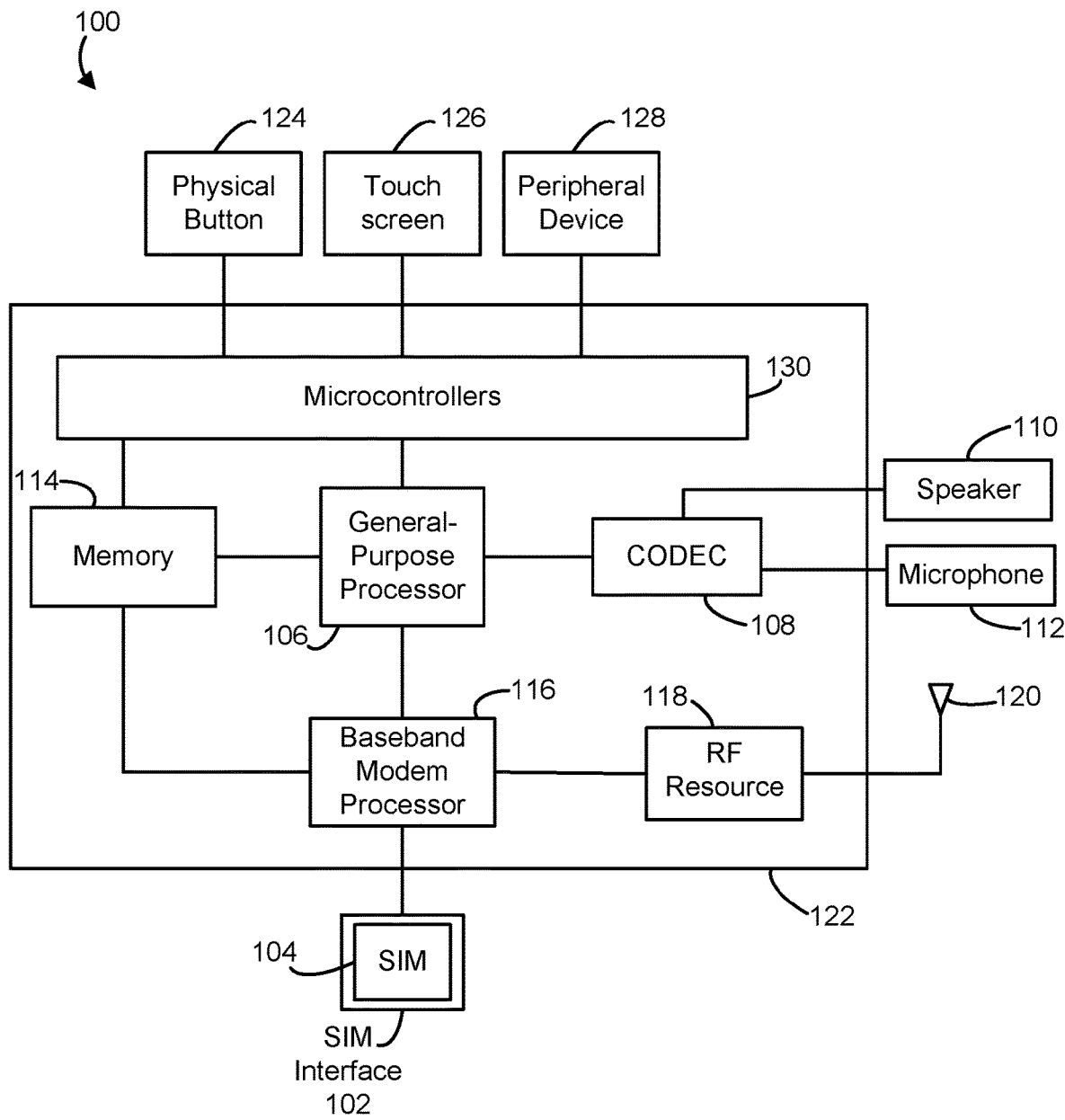
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, various embodiments include methods, and computing devices configured to implement the methods, for allowing software components that operate at a specific exception level (e.g., EL-3 to EL-1, etc.) to repeatedly or continuously observe or evaluate the integrity of software components operating at a lower exception level (e.g., EL-2 to EL-0) to ensure that the software components have not been corrupted or compromised (e.g., subjected to malware, cyberattacks, etc.). For example, various embodiments may allow monitor software operating at exception level 3 (EL-3) to observe or evaluate the integrity of a hypervisor operating at exception level 2 (EL-2) in a non-secure portion of the computing system and/or of a trust zone component operating at exception level 1 (EL-1) in a secure portion of the computing system. Similarly, various embodiments may allow the hypervisor to observe or evaluate the integrity of a guest operating system (OS) or virtual machine (VM) operating at exception level 1 (EL-1), for the guest OS or VM to observe or evaluate the integrity of end-user software applications operating at exception level 0 (EL-0), for the trust zone component to observe or evaluate the integrity of a trusted application at exception level 0 (EL-0) in a secure portion of the computing system, etc.

For ease of reference and to focus the discussion on the relevant features, some of the examples below may discuss operations with reference to a component operating at a lower exception level ("LEL component") and a component operating at a higher exception level ("HEL component"). It should be understood that the LEL component and HEL component may be implemented at any of privilege or execution level discussed in this application (e.g., EL-0 and EL-1, EL-1 and EL-2, etc.) and/or on any processor or processor architecture (e.g., ARM, Hexagon ST231, RISC-V, etc.) that contains hierarchical levels of execution.

In some embodiments, a processor in the computing device or computing system may be configured to collect reference data, label/mark portions of the collected reference data as critical data, generate hashes of the critical data, store the generated hashes of the critical data in memory as reference data, and communicate (or make available) the loading address of sections associated with the stored reference data to high privilege level handlers (e.g., a HEL component handler, EL-3 handler, monitor handler, etc.). The processor may invoke the HEL component regularly, periodically, and/or based on detected runtime events.

Upon invocation, the HEL component may perform various operations to verify that the integrity of the LEL component has not been compromised. For example, the HEL component may identify critical data currently in working memory (e.g., critical read-execute code and critical read only data currently present in random access memory, etc.), compute a hash of the identified critical data, and compare the computed hash with corresponding reference data (e.g., a section start address and/or a reference hash stored in memory by a HEL component) to determine whether the computed hash matches the stored reference data. In response to determining that the computed hash does not match the stored reference data, the HEL component may determine that the integrity of the LEL component has been compromised and perform a responsive action (e.g., quarantine the LEL component, notify security software, halt the system, etc.).

In some embodiments, the HEL component may be configured to obtain or determine the current vector base address (VBA) used by the LEL component, to detect or identify an exception raising instruction (ERI), and/or to read LEL component control and system registers (LEL-CSR). The HEL component may compare the current VBA, the ERI address (or ERI address ranges), and/or the values of the LEL-CSR registers to corresponding reference data. The HEL component may determine whether the integrity of the LEL component has been compromised based on whether the current VBA, the ERI address (or ERI address ranges), and/or the LEL-CSR register values match the corresponding reference data. The HEL component may determine that the integrity of the LEL component has been compromised and perform a responsive action (e.g., quarantine the LEL component, notify security software, halt the system, etc.) in response to determining that the current VBA, the ERI address (or ERI address ranges), and/or the LEL-CSR register values do not match the corresponding reference data.

The term "computing device" is used herein to refer to any of a variety of computing devices including smartphones, wireless or mobile computing devices (e.g., tablets, laptops, wearable devices, etc.), cellular-based wireless hotspots, IoT devices, eMTC devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

The term "monitor" is used herein to refer to any hardware or software component that may support virtualization technology and/or enables the abstraction (or virtualization) of computing resources, and which operates across execution environments (e.g., across a non-secure or rich/normal execution environment and a trusted/secure execution environment, etc.). This is used herein as the highest privilege level execution environment. A monitor may include any one or all of hardware monitors, specialized hardware fabricated on the chip, virtual machine monitors (VMMs), monitor software running outside of a high level operation system (HLOS), and software monitors running as part of device drivers, which may be outside the HLOS, its memory management systems, and/or its allocator functions.

The term "hypervisor" is used herein to refer to any hardware or software component that supports virtualization technology and/or enables the abstraction (or virtualization) of computing resources, and which operates within an execution environment (e.g., within the rich/normal execution environment, etc.). A hypervisor may create and operate virtual machines (VMs) and/or host multiple operating systems (called guest operating systems) and may act as Virtual Machine Manager. The hypervisor presents the guest operating systems with a virtual operating platform and manages the execution of the guest operating systems. Each guest operating system communicates with the hypervisor/monitor in the same manner it would communicate with the physical hardware. This allows each guest operating system to operate under the illusion of having exclusive access to the processors, peripherals, memory and I/O of the computing system.

FIG. 1 illustrates components of a computing device 100 that is suitable for implementing various embodiments. In the example illustrated in FIG. 1, the computing device 100 include a subscriber identity module (SIM) interface 102, an identity module SIM 104, a general-purpose processor 106 (e.g., a central processing unit ("CPU")), a coder/decoder (CODEC) 108, a speaker 110, a microphone 112, memory 114, a baseband modem processor 116, a radio frequency (RF) resource 118, antennas 120, a system-on-chip (SOC) 122, a physical button 124, a touchscreen display 126, peripheral devices 128 (e.g., camera, etc.), and various controllers/microcontrollers 130. In some embodiments, the general-purpose processor 106, memory 114, baseband processor(s) 116, and RF resource 118 may be included in the SOC 122. In some embodiments, the SIM 104 and its corresponding interfaces 102 may be external to the SOC 122.

In some embodiments, the computing device 100 may further include a graphics processor unit (GPU), a modem digital signal processor (DSP), an application processor unit (APU), and/or other specialized processors or hardware accelerators (not shown). Any or all of the processors in the computing device 100 may include one or more homogeneous or heterogeneous processor cores. The homogeneous processor cores may be cores that are configured for the same purpose and/or have the same or similar performance characteristics. Heterogeneous processor cores may be cores that are configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores.

The SIM interface 102 may configured to receive an identity module SIM 104 that is associated with a subscription to a mobile telephony network. In some embodiments, the computing device 100 may be a multi-subscription computing device that includes additional SIM interfaces, each of which may receive an additional identity module SIM associated with other subscriptions and/or other mobile telephony networks.

The general-purpose processor 106 may be coupled to the CODEC 108, which may be coupled to a speaker 110 and a microphone 112. The general-purpose processor 106 may also be coupled to at least one memory 114. The memory 114 may be a non-transitory computer readable storage medium that stores processor-executable instructions. The memory 114 may also store operating system (OS) software, application data, user application, software and/or executable instructions, including instructions configured to cause a processor to perform operations of various embodiments.

The baseband modem processor 116 may be an integrated chip capable of managing the protocol stacks of the SIMs 104 or subscriptions and implementing a co-existence manager software.

The RF resource 118 may include communication circuits or transceivers that perform transmit/receive functions for the associated SIM 104 of the computing device 100. The RF resource 118 may include communication circuits that include separate transmit and receive circuitry, or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage-controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth, near-field communication, and/or the like). The RF resources 118 may also be coupled to the baseband modem processor 116.

The computing device 100 may be configured to operate within a variety of communication systems, such as mobile telephony networks. The computing device 100 may communicate with a mobile telephony network via a cellular connection to a base station of the mobile telephony network. The cellular connection may be made through two-way wireless communication links using a variety of communication technologies, such as Long Term Evolution (LTE), fifth generation (5G), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS); WPANs, such as Wireless USB, Bluetooth, and ZigBee; and/or near-field communication.

Figure 2A:
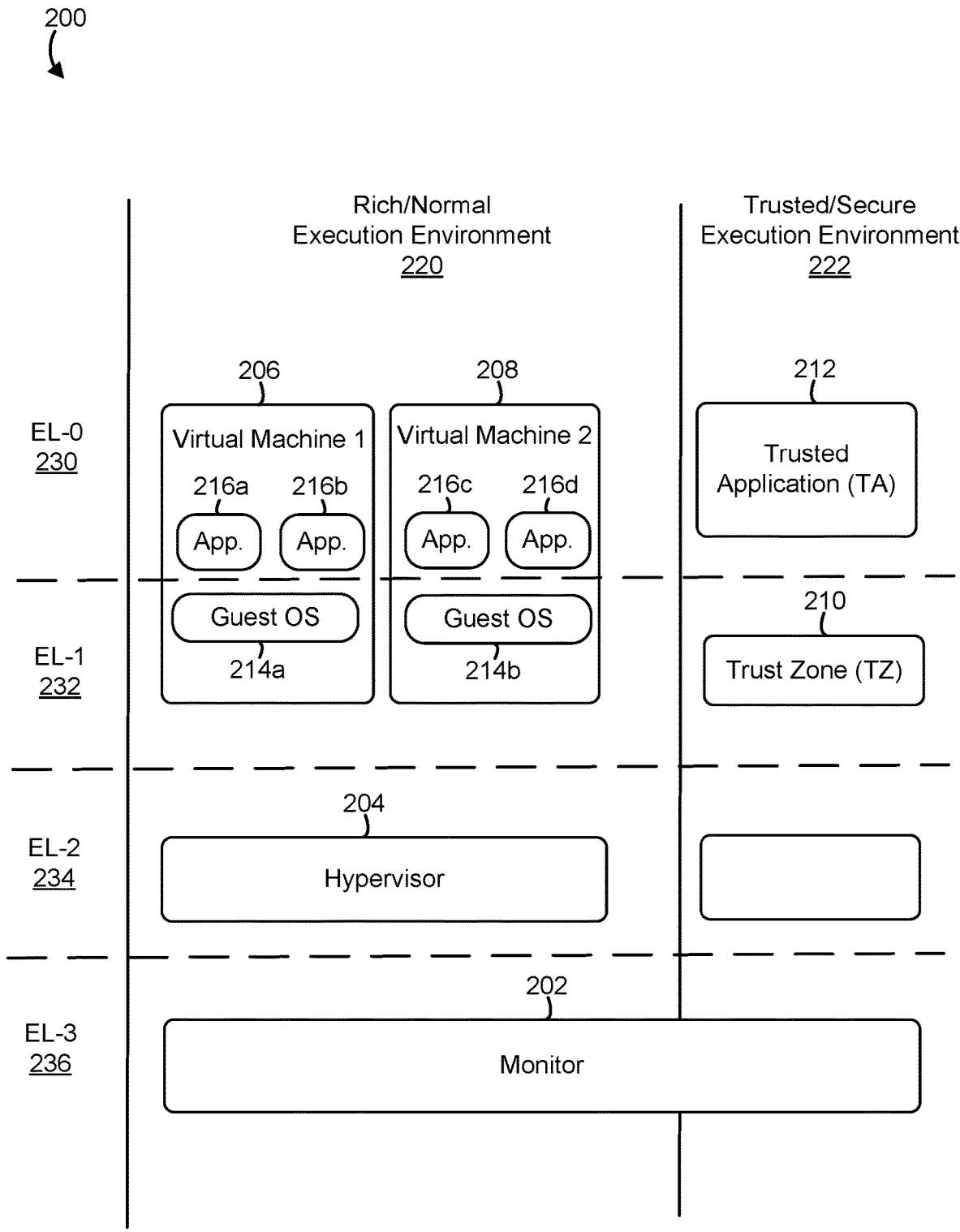
FIGS. 2A and 2B are component block diagrams illustrating privileges or exception levels (ELs) in an example computing device suitable for implementing various embodiments.

FIG. 2A illustrates an example software architecture of a computing system 200 of software, firmware and functional modules (which are also referred to herein as "components") that may execute in a processor (e.g., 106 FIG. 1) suitable for implementing various embodiments. FIG. 2A illustrates an example software architecture of a computing system 200 of software, firmware and functional modules ("components") that may execute in a processor (e.g., 106 FIG. 1) suitable for implementing various embodiments.

In the example illustrated in FIG. 2A, the computing system 200 includes a monitor 202 component, a hypervisor 204 (or access control driver) component, virtual machines 206, 208, a trust zone (TZ) 210 component, and a secure or trusted application (TA) 212. The computing system 200 may also include various additional functional components configured to accomplish various functions described herein, such as a host operating system, a DSP operating system, library modules, software application programs, user processes, listener threads, execution hardware (e.g., an application processor, DSP, etc.), input/output devices, memories, etc.

The computing system 200 may include various execution environments, including a non-secure or rich/normal execution environment 220 and a trusted/secure execution environment 222 (e.g., a trusted execution environment (TEE), an ARM TrustZone execution environment, etc.). The rich/normal execution environment 220 may include the hypervisor 204 and the virtual machines 206, 208 (e.g., virtual machine 1 and virtual machine 2). The trusted/secure execution environment 222 may include the TZ 210 component and the TA 212. The monitor 202 component may operate across the various execution environments, and may be configured to control accesses to the trusted/secure execution environment 222.

Figure 2B:
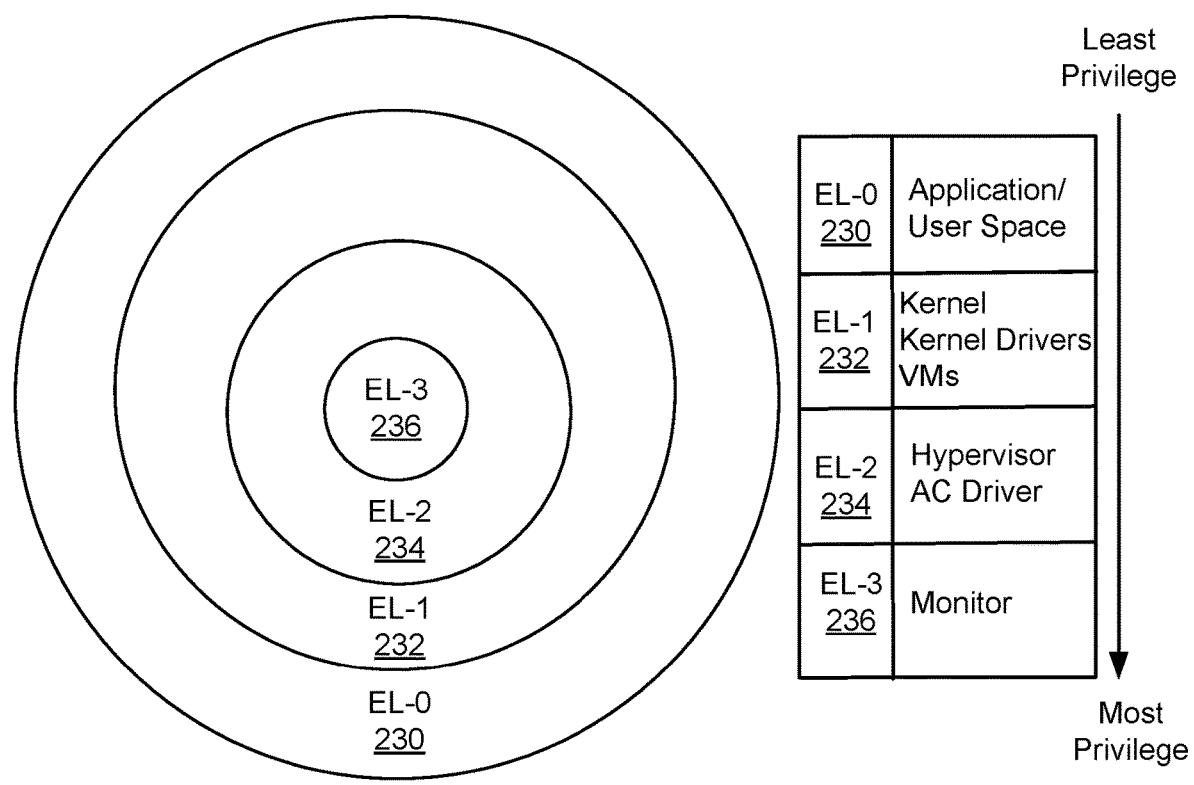

FIGS. 2A and 2B illustrate that the components in the computing system 200 may be configured to execute within various exception levels (EL) 230-236 that control execution privileges to the components executing within each level. In the example illustrated in FIG. 2A, the software applications 216a-216d and the TA 212 operate within exception level 0 (EL-0 230). The guest operating systems 214a-214b and the TZ 210 component operate within exception level 1 (EL-1 232). The hypervisor 204 operates within exception level 2 (EL-2 234). The monitor 202 operates within exception level 3 (EL-3 234). FIG. 2B illustrates that exception level 0 (EL-0 230) may include application/user space components, exception level 1 (EL-1 232) may include the kernel, kernel drivers, and virtual machines (VMs), exception level 2 (EL-2 234) may include the hypervisor and access control (AC) drivers, and exception level 3 (EL-3 236) may include the monitor.

The exception levels are numbered (e.g., EL-0 to EL-3) such that the higher levels of privilege have higher numbers. For example, a hypervisor 204 operating in exception level 2 (EL-2 234) may have greater execution privileges than software applications 216a-216d executing in exception level 0 (EL-0 230).

The monitor 202 component may include hardware and/or software component configured to support virtualization technologies and/or to enable the abstraction (or virtualization) of computing resources, including any one or all of hardware monitors, specialized hardware fabricated on the chip, virtual machine monitors (VMM), monitor software running outside of a high level operation system (HLOS), and software monitors running as part of device drivers, which may be outside the HLOS, its memory management systems, and/or its allocator functions. The monitor 202 component may operate in both the rich/normal execution environment 220 and the trusted/secure execution environment 222, and host the hypervisor 204 component.

The hypervisor 204 component may be a software control program between the operating system and the monitor 202 component. The hypervisor 204 component may host multiple operating systems (called guest operating systems). Each guest operating system 214a-214b may communicate with the hypervisor 204 and/or monitor 202 components in the same manner it would communicate with the physical hardware (e.g., general-purpose processor 106 illustrated in FIG. 1, etc.), viewing the combination of the hypervisor 204, monitor 202 and hardware as a single, virtual machine. This allows each guest operating system 214a-214b to operate under the illusion of having exclusive access to the processors, peripherals, memory and I/O.

The hypervisor 204 component may be configured to manage memory access requests by the virtual machines 206, 208. That is, operating systems are generally responsible for partitioning the physical memory across multiple processes. However, in systems that include a guest operating system 214a-214b running on top of a virtual machine 206, 208, the memory allocated by the guest operating system 214a-214b is not the true physical memory, but an intermediate physical memory. On such systems, the hypervisor 204 component is responsible for the actual allocation of the physical memory.

The virtual machines 206, 208 may be software applications that execute software application programs like a physical hardware machine. For example, the virtual machines 206, 208 may provide an interface between software applications 216a-216d and the physical hardware (e.g., general-purpose processor 106 illustrated in FIG. 1, etc.), allowing software application programs tied to a specific instruction set architecture (ISA) to execute on hardware implementing a different instruction set architecture. By creating and managing virtual machines (VMs), the computing system 200 may create a "sandbox" (i.e., secured separation) around various features, including operating systems, applications, processes, etc. The computing system 200 may use these sandboxes to enforce access control among various features of the device.

The execution environments 220, 222 may be loaded via a secure boot procedure. Generally, secure boot is a boot sequence in which each software image that is loaded and executed on the computing system 200 is authenticated and/or authorized via previously authenticated/authorized software. The boot sequence may be configured to prevent unauthorized or modified code from being run on the computing device by ensuring that each software image is checked before it is executed. The first image in the boot sequence is called the Primary Boot Loader (PBL), which is often stored in an immutable read-only memory that cannot be physically altered. The PBL authorizes each software image that is loaded and executed on the computing system 200 by cryptographically verifying digital signatures on each software image it loads. Those software images cryptographically verify the digital signatures on the next set of images that they load, and so on. This ensures that the software images have not been altered.

In some embodiments, the PBL may be configured to load an eXtensible Boot Loader (XBL) image and a trusted Secure eXtensible Boot Loader (XBL_SEC) image. The XBL image may be configured to coordinate the loading of the rich/normal execution environment 220, which may include the OS kernel and peripheral firmware images. The XBL_SEC image may be configured to coordinate the loading of the trusted/secure execution environment 222, which may include the trusted execution environment (TEE) and TEE-related images. The separation and isolation of the TEE images during the loading process may improve security by shortening the chain of images that must be loaded, authorized and executed before the TEE image is operational. The XBL_SEC image may also configure the monitor 202 or access control system to isolate memory used by the trusted/secure execution environment 222 from all other execution environments on the chip, and then execute the XBL image at a less-privileged exception level.

Figure 3:
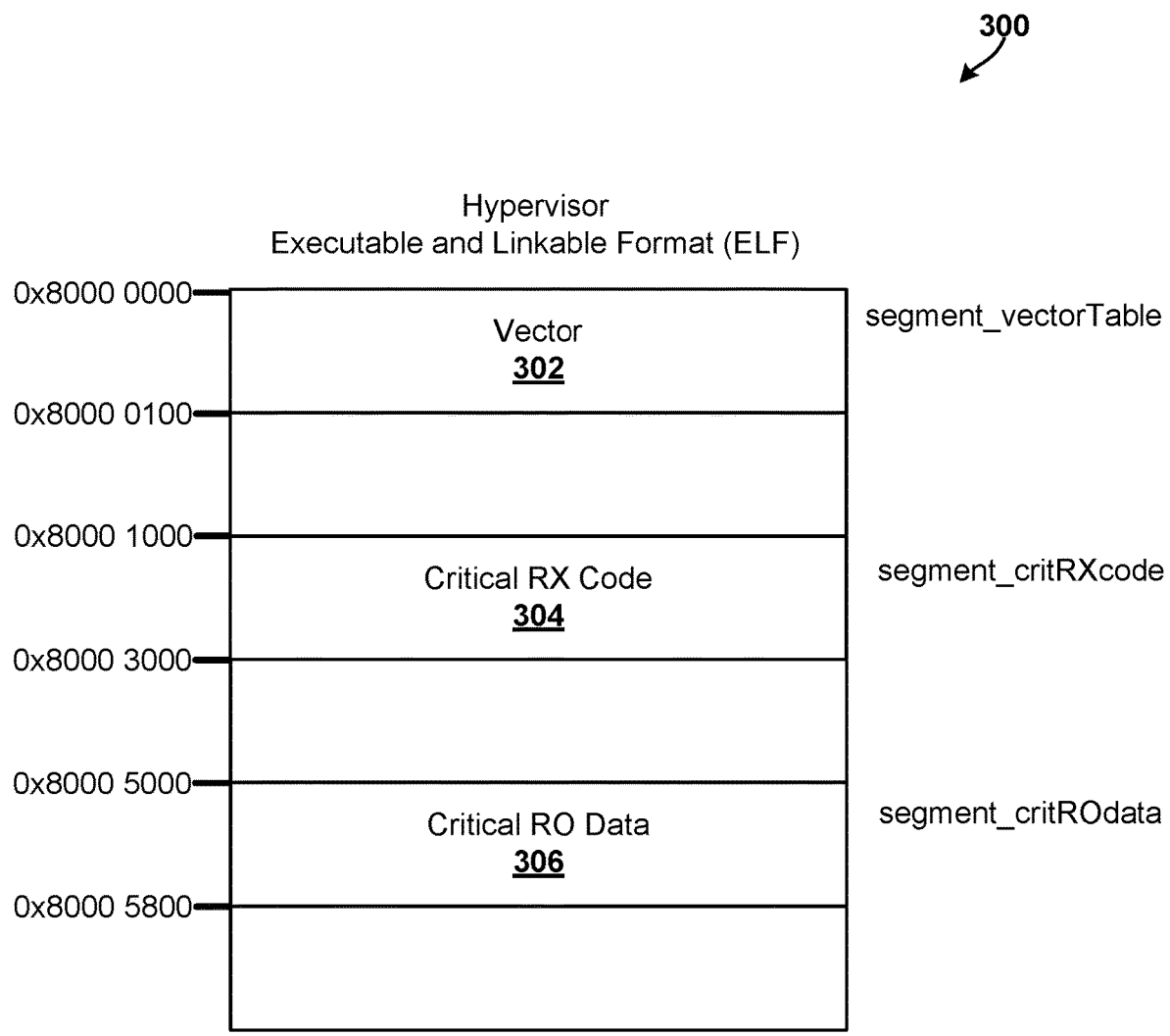
FIG. 3 is a component block diagram illustrating an example hypervisor executable and linkable format image suitable for implementing some embodiments.

The software images loaded by the XBL and/or XBL_SEC may be Executable and Linkable Format (ELF) software images, an example of which is illustrated in FIG. 3. An ELF software image may include multiple individual ELF segments. In the example illustrated in FIG. 3, hypervisor ELF image 300 includes a vector table segment 302, a critical read-execute (RX) code segment 304, and a critical read only (RO) data. Each ELF segment may include code, data, or metadata about the software image. For example, an ELF software image file may include a hash segment that includes data used to authenticate the software image. The hash segment may include a table of cryptographic hash values and a collection of metadata about the software image. The cryptographic hash values in the table may be computed over the other segments in the ELF image software, and used to verify the correctness of those segments when they are loaded into memory. The metadata may include information about the type of image and the type of hardware on which the software image is designed to be executed.

In the example illustrated in FIG. 2A, the hypervisor 204 component operates in the rich/normal execution environment 220 within exception level 2 (EL-2 234), and host software applications 216a-216d that operate in the rich/normal execution environment 220 within exception level 0 (EL-0 230). Conventional hypervisors do not have dynamic mechanisms that allow the hypervisor to continually check the integrity of the virtual machines 206, 208 on which the software applications 216a-216d operate. As a result, a conventional hypervisor may not be able to determine whether the virtual machines 206, 208 are being operated by a rouge or nefarious actor (e.g., as part of a cyber-attack, etc.) and/or whether the virtual machines 206, 208 are performing non-benign activities that could negatively impact the security, performance or functionality of the computing system 200.

Further, because the hypervisor 204 component hosts the guest operating systems 214a-214b and operates in the rich/normal execution environment 220, both a conventional hypervisor 204 component and the guest operating systems 214a-214b may be susceptible to malware and cyber-attacks by rouge or nefarious actors. Because the hypervisor 204 component is hosted by the monitor 202, a compromised hypervisor may compromise the integrity of trusted/secure components (e.g., trust zone (TZ) 210 component, trusted application (TA) 212, etc.) and trusted/secure content. Conventional trusted/secure components do not include mechanisms that allow them to determine whether a hypervisor has been compromised by a rouge or nefarious actor (e.g., as part of a cyber attack, etc.) and/or is performing non-benign activities.

Various embodiments provide methods that enable software/components operating at a specific exception level (e.g., EL-3 to EL-1) to repeatedly or continuously observe and/or evaluate the integrity of software/components operating at a lower exception level (e.g., EL-2 to EL-0). Using the architecture illustrated in FIG. 2A as an example, various embodiments may enable the monitor 202 component to observe and/or evaluate the integrity of the hypervisor 204 component, enable the hypervisor 204 component to observe and/or evaluate the integrity of the guest operating systems 214a-214b and/or the virtual machines 206, 208, enable the guest operating systems 214a-214b to observe and/or evaluate the integrity of the software applications 216a-216d, enable the TZ 210 components to observe and/or evaluate the integrity of the TAs 212, and so on.

In some embodiments, a processor in the computing system (and/or the XBL_SEC, etc.) may be configured to collect reference data, label/mark portions of the collected reference data as critical data, generate hashes of the critical data, store the generated hashes of the critical data in memory as reference data, and communicate (or make available) the loading address of sections associated with the stored reference data to high privilege level handlers (e.g., HEL component handler, EL-3 handler, monitor handler, etc.). The processor may invoke the HEL component regularly, periodically, and/or based on detected runtime events. Upon invocation, the HEL component may perform various operations to verify that the integrity of the LEL component has not been compromised. For example, the HEL component may obtain or determine the current vector base address (VBA) used by the LEL component, and compare the current VBA to the reference data. The HEL component may determine that the integrity of the LEL component has been compromised in response to determining that current VBA does not match the reference data.

A processor in the computing system 200 (or XBL_SEC, etc.) may be configured according to some embodiments to identify and label critical data. For example, the processor may identify and label as critical data any or all of access control driver (ACD) code, hypervisor vector tables, operating system vector tables, hypervisor vector handlers associated with exception vectors, secure monitor call (SMC) interface/invoker code, SMC instruction code addresses, access control data/policies, virtual machine policy manager code/resource, hypervisor execution flow variables, and user defined marked critical sections.

Concurrent with loading the LEL component, the HEL component (or XBL_SEC, etc.) may generate hashes of the critical data associated with the LEL component, store the generated hashes as reference data (or measurement parameters) for the LEL component in a register or memory, and send (or make available) the register/memory addresses for the stored LEL component hashes to high privilege level handlers (e.g., EL-3 handler, HEL component handler, etc.). Once stored, the HEL component (i.e., higher privilege level components) may access the stored reference data (e.g., hashes) for comparison to current critical data (or hashes of critical data) of the LEL component when monitored to determine if the LEL component has been compromised, altered, or otherwise different from the authenticated version that was loaded during the boot sequence described above.

In some embodiments, the processor in the computing system 200 may be configured to invoke the HEL component to monitor one or more LEL components regularly, periodically, randomly or based on predefined criterion, such as an event that could be indicative of or associated with the LEL component(s) becoming compromised or altered. For example, the processor may be configured to invoke the HEL component based on system calls or other real-time or runtime events. In some embodiments, the processor may be configured to invoke the HEL component based on a regular machine interrupt with a cyclic executive trigger. For example, the processor may invoke the HEL component at periodic or regular intervals based on a secure watch dog (WD) bark that acts as a cyclic executive for interrupts.

In some embodiments, the processor may be configured to invoke the HEL component based on a random machine interrupt with a pseudo random table-driven trigger. For example, the processor may use a timer interrupt registered at the highest privilege level (e.g., EL-3), with regular interval interrupts or pseudo randomized intervals based on the previous timer interrupt that would invoke normalize random number for next in interrupt interval. The timer interrupt could function as a table (timer) driven scheduler based on pseudo randomization to invoke the next interrupt.

In some embodiments, the processor may be configured to invoke the HEL component based on a user triggered machine interrupt with an event-based trigger. For example, the processor may invoke the HEL component at periodic or regular intervals by using client request-based invocation, such as use-case triggered intervals, that act as event driven based scheduling for interrupts.

In some embodiments, the processor may be configured to invoke the HEL component based on system calls or other real-time or runtime events. For example, the processor may be configured to invoke the HEL component in response to detecting a system call or instruction execution that is associated with a change in the current exception level. For example, the processor may invoke the HEL component in response to detecting an SMC call from the hypervisor 204 component to the TZ 210 component, in response to detecting a secure monitor call (SMC) or hypervisor call (HVC) from the guest operating system 214a-214b to the hypervisor 204 component, in response to detecting a stage 2 level data abort operation, etc.

When invoked, the HEL component may perform various operations to determine whether the integrity of the LEL component has been compromised. For example, in some embodiments, the HEL component may identify critical data (e.g., critical RX code and critical RO data currently present in DDR SDRAM, etc.) currently in working memory used by the LEL component, compute a hash of the identified critical data, compare the computed hash with reference data (e.g., an ELF section start address and a reference hash stored in memory by the XBL_SEC, etc.), determine whether the calculated hash matches the reference data based on the comparison, verify that the integrity of the LEL component has not been compromised in response to determining that the calculated hash matches the reference data, and determine that the integrity of the LEL component has been compromised in response to determining that the calculated hash does not match the reference data. In some embodiments, the HEL component may compute the hash of the critical data currently in working memory using the same hash function as used to generate hash reference data during the LEL component loading sequence.

In some embodiments, the HEL component may be configured to determine whether the integrity of the LEL component has been compromised by determining the current vector base address (VBA) used by the LEL component, comparing the current VBA with reference data of the VBA to determine whether the current VBA matches the reference data, determine that the integrity of the LEL component has not been compromised in response to determining that the current VBA matches the reference data, and/or determine that the integrity of the LEL component has been compromised in response to determining that the current VBA does not match the reference data. In some embodiments, the HEL component may determine the current VBA used by the LEL component by reading a vector base address register (VBAR). In some embodiments, the HEL component may determine the current VBA used by the LEL component by reading a vector table base holder (e.g., ELx_VBAR on ARM processors, MTVAL on RISC-V processors, event vector back (EVB) on Hexagon DSPs, etc.)

In some embodiments, the HEL component may identify an "exception raising instruction," determine the address of the exception raising instruction, compare the address of exception raising instruction to the reference data, determine that the integrity of the LEL component has not been compromised in response to determining that the address of the exception raising instruction matches the reference data, and/or determine that the integrity of the LEL component has been compromised in response to determining that the address of the exception raising instruction does not match the reference data.

In some embodiments, the HEL component may determine the address of the "exception raising instruction" by capturing an address in the highest exception level from a hypervisor SMC code section or reading any or all of an exception link register (ELR, ELRx, etc.), reading a machine exception program counter (MEPC), reading the program counter (PC) value for the instruction executed when the exception occurred, reading a processor system control register, etc.

In some embodiments, the HEL component may be configured to compare the captured SMC address in the highest exception link register with the reference data, and determine whether the integrity of the LEL component has been compromised based on the results of the comparison.

In some embodiments, the HEL component may be configured to determine the current vector base address (VBA) of the LEL component, determine whether the current VBA matches the reference data, determine that the integrity of the LEL component has not been compromised in response to determining that the current VBA matches the reference data, and/or determine that the integrity of the LEL component has been compromised in response to determining that the current VBA does not match the reference data. In some embodiments, the HEL component may be configured to determine the current VBA of the LEL component by reading a core vector table base address register or a vector table base address holder, such as an exception level vector base address register (ELx_VBAR), machine trap value register (MTVAL), or event vector base (EVB).

In some embodiments, the HEL component may be configured to read LEL control and system (LEL-CSR) registers and validate the values as required by the system. The HEL component may compare the values of the LEL-CSR registers to reference data, determine whether the LEL-CSR register values match the reference data, determine that the integrity of the LEL component has not been compromised in response to determining that the LEL-CSR register values match the reference data, and/or determine that the integrity of the LEL component has been compromised in response to determining that the LEL-CSR register values do not match the reference data.

Figure 4:
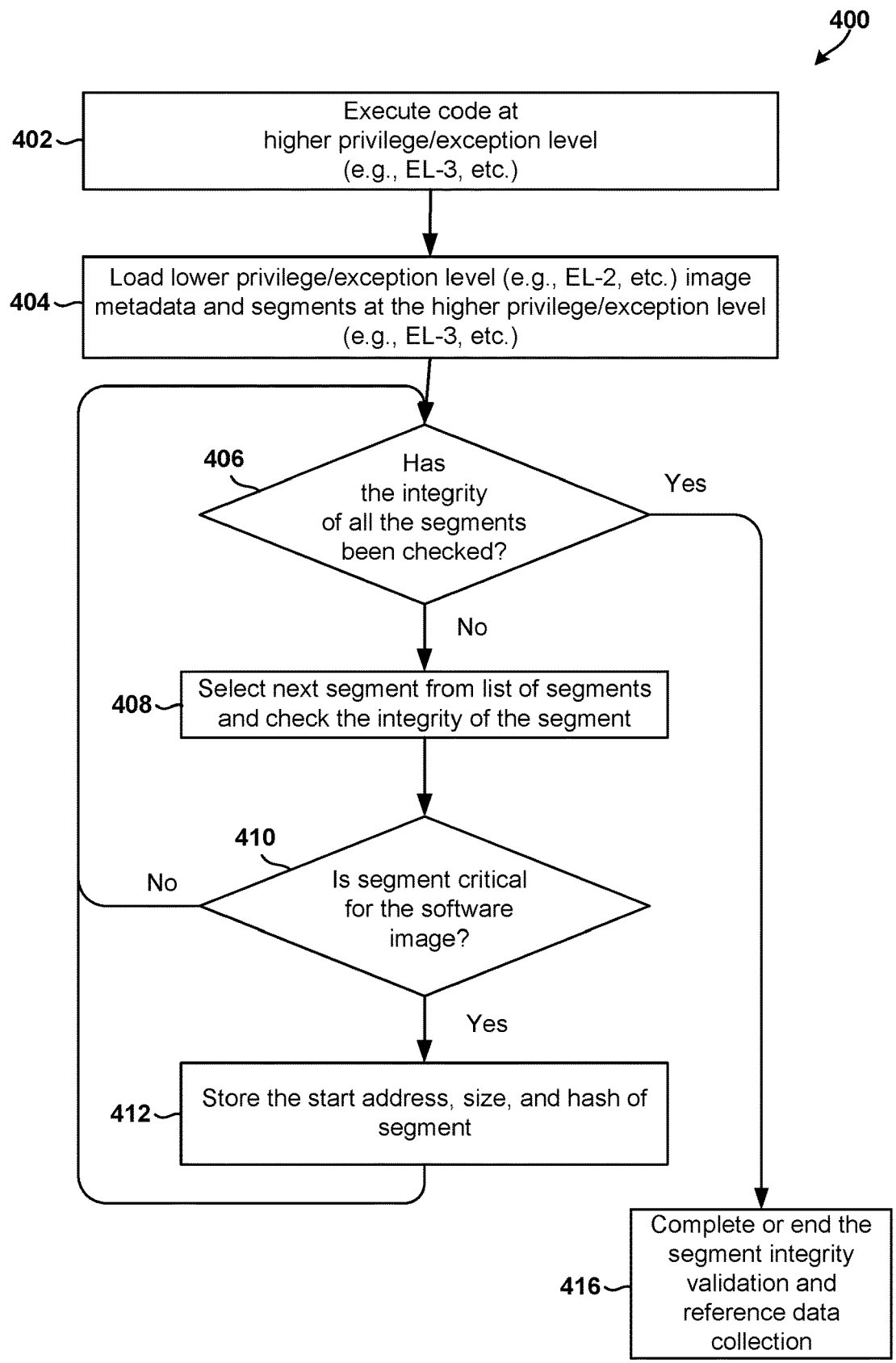
FIG. 4 is a process flow diagram illustrating a method for verifying the integrity of software components of the computing device and collecting reference data from the verified components in accordance with some embodiments.

FIG. 4 illustrates a method 400 for verifying the integrity of software components of the computing device and collecting reference data from the verified components in accordance with some embodiments. With reference to FIGS. 1-4, the method 400 may be performed by a processor (e.g., general-purpose processor 106, GPU, DSP, APU, etc.) in a computing device.

In block 402, the processor may commence executing code at a higher privilege/exception level (e.g., EL-3, etc.). For example, the processor may load a software component operating at a higher exception level ("HEL component") into the runtime system of the computing device in block 402. In some embodiments, the HEL component may be a monitor component that operates in both a rich/normal execution environment and a trusted/secure execution environment of the computing device, and within exception level 3 (EL-3).

In block 404, the processor may load lower privilege/exception level (e.g., EL-2, etc.) image metadata and segments at the higher privilege/exception level (e.g., EL-3, etc.). In some embodiments, the processor may also perform boot up image authentication by the HEL component for a software component operating at a lower exception level ("LEL component").

In some embodiments, in block 404, the processor may load metadata and segments of operating software at a lower privilege/exception level (e.g., EL-2, etc.). For example, the processor may load metadata and segments for the LEL component in block 404. As another example, the processor may cause the HEL component to load the metadata and segments of the LEL component in block 404. In some embodiments, the LEL component may be a hypervisor component that operates in the rich/normal execution environment within exception level 2 (EL-2).

In determination block 406, the processor (or a loader in HEL component) may compare pre-calculated hashes of the identified critical segments with loadable segment data and determine whether the integrity of all the identified critical segments have been checked/evaluated. The hashes may be computed using any of a variety of available hash algorithms (e.g., RSA256, RSA384, RSA512, DES, etc.).

In response to determining that the integrity of all the identified critical segments been checked/evaluated, the processor may complete or end the verification and/or data collection cycle in block 416. This may be the end of data collection and reference data authentication (from the pre-calculated hashes as described above). For example, Hypervisor reference data (critical segments) integrity validation may occur during the secure boot (XBL_SEC). After performing the operations in block 416, the HEL component may be ready to invoke the LEL component and the computing device may continue normal execution. Later, the processor/computing device may use the collected reference data for LEL component integrity validation.

In response to determining that the integrity of all the identified critical segments have not yet been checked/evaluated, the processor may select the next segment from a list of segments in block 408. In determination block 410, the processor may determine whether a current segment is critical for the software image in determination block 410. For example, the HEL component may determine whether the current segment includes critical read-execute (RX) code or critical read only (RO) data for LEL component. As another example, HEL component may determine whether the current segment LEL component includes access control driver (ACD) code, hypervisor vector tables, operating system vector tables, hypervisor vector handlers associated with exception vectors, secure monitor call (SMC) interface/invoker code, SMC instruction code addresses, access control data/policies, virtual machine policy manager code/resource, hypervisor execution flow variables, or user defined marked critical sections.

As part of the operations in blocks 408 and/or 410, the processor may use the name of the segments to determine the critical segment in the HEL component, as posted in hypervisor ELF image (e.g., segment_critXXXX). The processor could also use pre-determined patterns or arrangement of segments or any offline compile time marking in the segments. The HEL component loader may detect those markings and mark the segments to evaluate.

In response to determining that the segment is critical for the software image (i.e., determination block 410="Yes"), the processor may store the start address, size, and hash of the critical segment in block 412. This data may be stored in a register or memory that is accessible to the HEL component but not to LEL components. The reference data may be stored in DRAM/SRAM or any memory that is under protection of the HEL component and accessible by the HEL component. This may ensure that LEL component does not corrupt the reference data. The memory may also be protected by any other suitable technique or technology known in the art, such as via hardware protection units, memory management unit (MMU) protection units, a hardware firewall, or any software mechanism that is accessible in the HEL component.

In response to determining that the selected segment is not critical for the software image (i.e., determination block 410="No"), the processor may determine whether the integrity of all the marked critical segments been checked/evaluated in determination block 406. The operations of blocks 406-412 may be performed repeatedly until all the identified critical segments have been evaluated.

Figure 5:
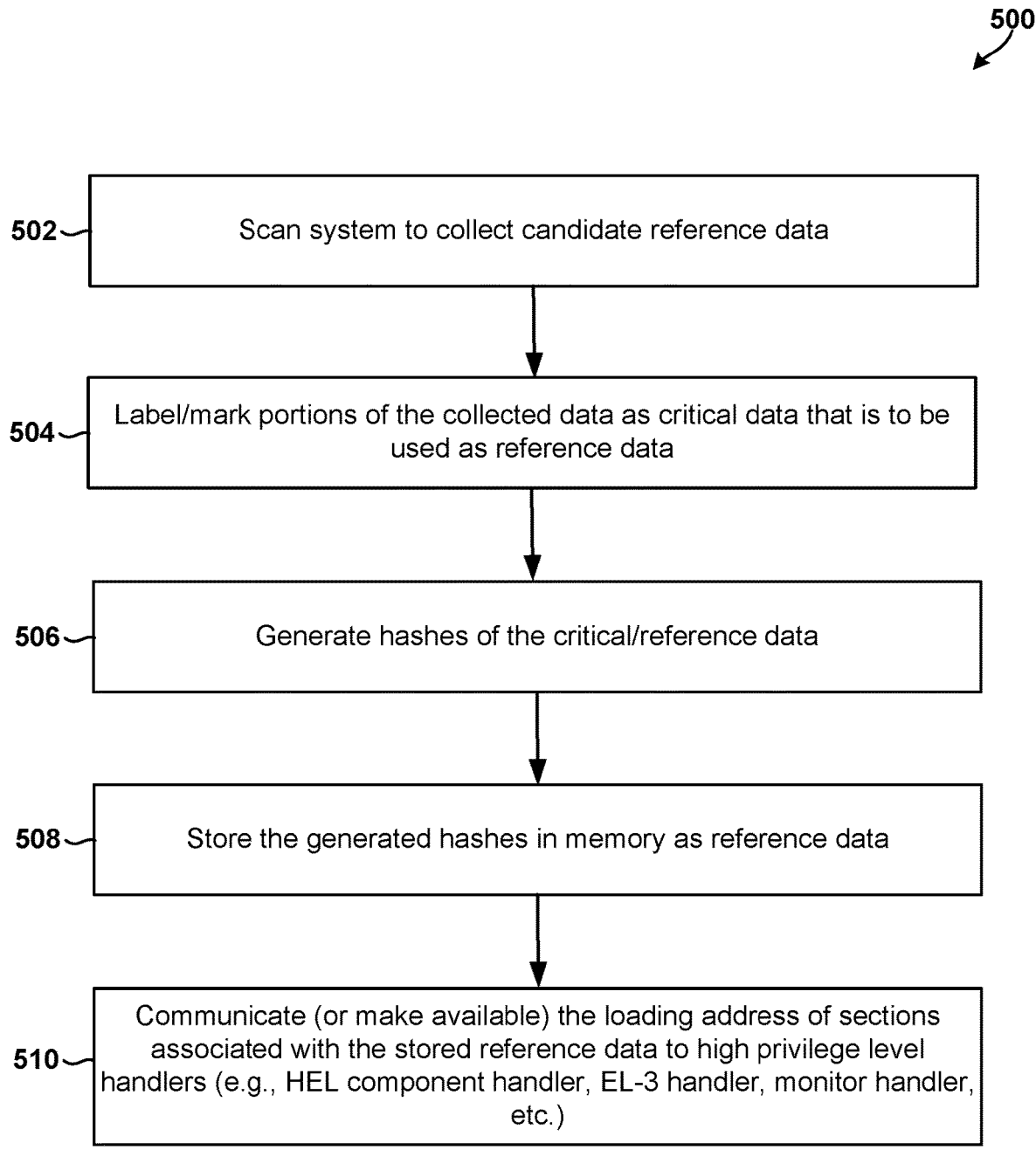
FIG. 5 is a process flow diagram illustrating a method for collecting reference data suitable for use in evaluating the integrity of software components in accordance with some embodiments.

FIG. 5 illustrates a method 500 for collecting reference data suitable for use in evaluating the integrity of software components in accordance with some embodiments. With reference to FIGS. 1-5, the method 500 may be performed by a HEL component operating on a processor (e.g., general-purpose processor 106, GPU, DSP, APU, etc.) in a computing device.

In block 502, the HEL component may scan lower privilege/exception levels of the system to collect reference data. For example, the HEL component may scan the software image for data, code or segments that could include access control driver (ACD) code, LEL component vector tables (e.g., hypervisor vector tables), operating system vector tables, LEL component vector handlers associated with exception vectors, secure monitor call (SMC) interface/invoker code, SMC instruction code addresses, access control data/policies, virtual machine policy manager code/resource, hypervisor execution flow variables, or user defined marked critical sections. Means for performing functions of block 502 may include a processor (e.g., 106) coupled to memory (e.g., 114).

In block 504, the HEL component may store the collected reference data as critical data that is to be used as reference data in memory protected from LEL component access. For example, the HEL component may identify and label as critical data collected data that include any or all of access control driver (ACD) code, hypervisor vector tables, operating system vector tables, hypervisor vector handlers associated with exception vectors, secure monitor call (SMC) interface/invoker code, SMC instruction code addresses, access control data/policies, virtual machine policy manager code/resource, hypervisor execution flow variables, and user defined marked critical sections. Means for performing functions of block 504 may include a processor (e.g., 106) coupled to memory (e.g., 114).

In block 506, the HEL component may generate hashes of the critical/reference data. For example, the processor may execute a hash function or operation on the critical data to generate hash values, hash codes, digests, or simply hashes that may be used to index to a hash table. Means for performing functions of block 506 may include a processor (e.g., 106) coupled to memory (e.g., 114).

In block 508, the HEL component may store the generated hashes as reference data (or measurement parameters) in a register or memory accessible to the HEL component but not to LEL components. The data may be formatted and/or stored using any of a variety of techniques or technologies known in the art that allow the reference data to be stored so that it is not accessible to LEL components at any time but accessible by the HEL component whenever required. Means for performing functions of block 508 may include a processor (e.g., 106) coupled to memory (e.g., 114).

In block 510, the HEL component may communicate (or make available) the loading address of sections associated with the stored reference data to high privilege level handlers (or the HEL component handler, EL-3 handler, monitor handler, or any software that could perform runtime integrity checks running at the HEL component level). That is, the HEL component handlers and/or software running in the HEL component have the same high privilege level. While some embodiments use HEL component handlers as an example, it should be understood that any software that would perform runtime integrity checks running at the HEL component level is equally applicable. Software design may invoke handlers/integrity software by any function call mechanisms in HEL component. Means for performing functions of block 510 may include a processor (e.g., 106) coupled to memory (e.g., 114).

Figure 6:
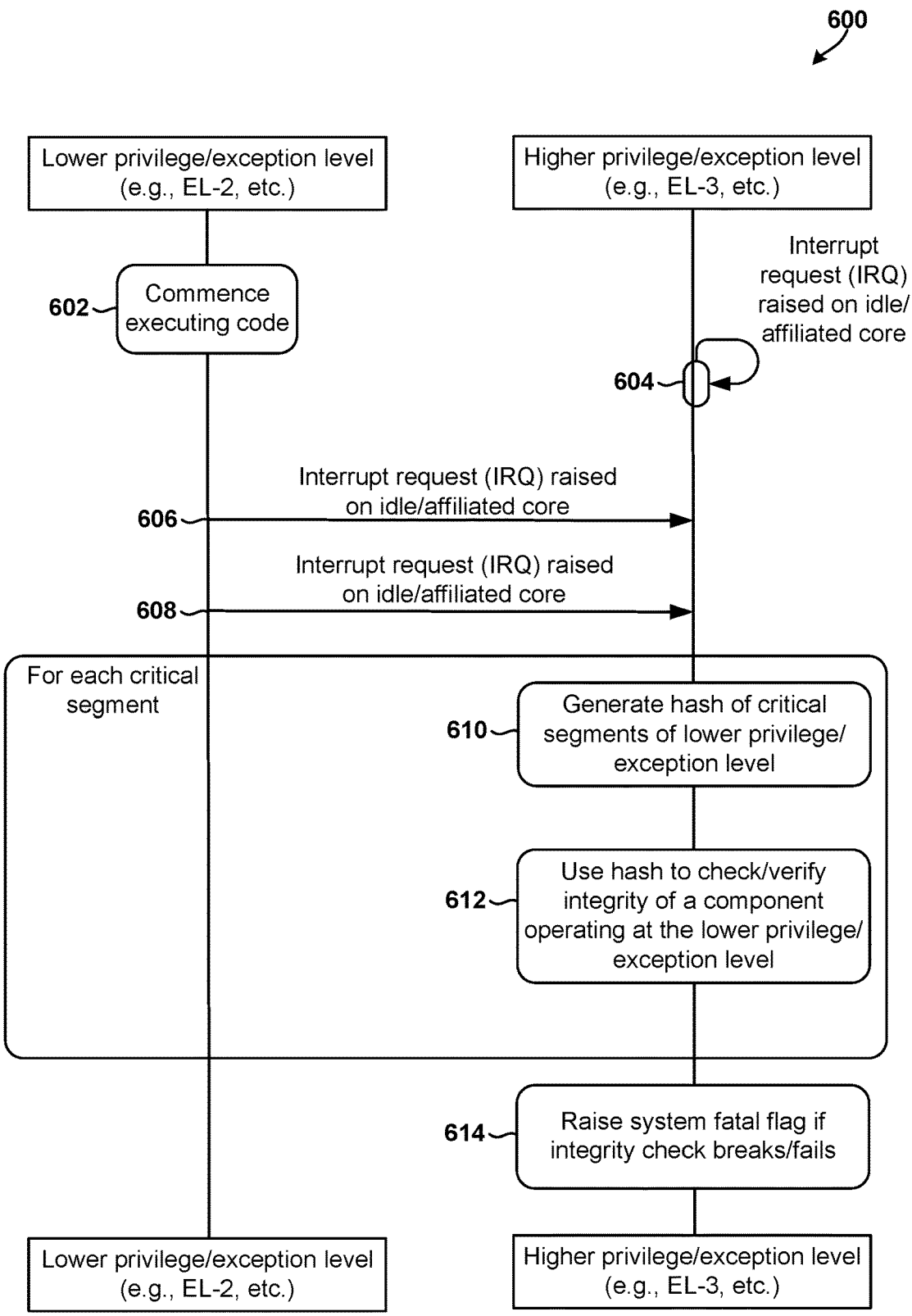
FIG. 6 is a message flow diagram illustrating operations, communications and interactions in a system configured to determine whether a software component has been corrupted or compromised regularly, periodically, and/or based on user-defined events in accordance with some embodiments.

FIG. 6 illustrates operations, communications and interactions in a system configured to perform a predicated method 600 for observing and evaluating whether a software component has been corrupted or compromised in accordance with some embodiments. With reference to FIGS. 1-6, the predicated method 600 may be performed by a processor (e.g., general-purpose processor 106, GPU, DSP, APU, etc.) in a computing device.

In block 602, the processor may commence executing code at a lower privilege/exception level (e.g., EL-2, etc.). For example, the processor may load a software component operating at a lower exception level ("LEL component") into the runtime system of the computing device in block 602. In some embodiments, the LEL component may be a hypervisor component that operates in the rich/normal execution environment within exception level 2 (EL-2).

In any or all of blocks 604, 606 and 608, the processor may invoke the HEL component based on an interrupt request (IRQ), which may be received from or detected on an idle or affiliated component, processor, or core. For example, in block 604, the processor may invoke the HEL component based on a regular machine interrupt with a cyclic executive trigger, which may be used to invoke the HEL component at periodic or regular intervals based on a secure watch dog (WD) bark that acts as a cyclic executive for interrupts.

In block 606, the processor may invoke the HEL component based on a random machine interrupt with a pseudo random table-driven trigger. For example, the processor may use a timer interrupt registered at the highest privilege level (e.g., EL-3), with regular interval interrupts or pseudo randomized intervals based on the previous timer interrupt that would invoke normalize random number for next in interrupt interval. The timer interrupt could function as a table (timer) driven scheduler based on pseudo randomization to invoke the next interrupt.

In block 608, the processor may invoke the HEL component based on a user triggered machine interrupt with an event-based trigger. For example, the processor may invoke the HEL component at periodic or regular intervals by using client request-based invocation, such as use-case triggered intervals (e.g., content protection (CPZ) use cases, DRM use cases, secure display, secure camera, etc.) that act as event-driven-based scheduling for interrupts.

In block 610, the processor may generate a hash of critical segments of one or more lower privilege/exception level components (i.e., LEL components). In some embodiments, the processor may generate a hash for each critical segment of the one or more lower privilege/exception level components. In some embodiments, the processor may generate the hash or hashes using the same hash function as used in during loading of the one or more lower privilege/exception level components, such as in block 412 of the method 400.

In block 612, the processor may use the generated hash to check/verify integrity of a segment associated with the component operating at the lower privilege/exception level (e.g., the LEL component, etc.). For example, the processor may compare the generated hash to a hash generated and stored during loading of the one or more lower privilege/ exception level components, such as in block 412 of the method 400.

In some embodiments, the processor may perform the operations in 610 and 612 repeatedly for each critical segment (e.g., each segment determined to be critical in determination block 410 of the method 400).

In block 614, the processor may take an action, such as set a system error flag, in response to determining that the integrity check failed. For example, if the integrity of any of the critical segments is not verified, such as the hash generated in block 610 does not match the stored hash as determined in block 612, the processor may issue/raise a "System Fatal" call/flag in block 614.

Figure 7:
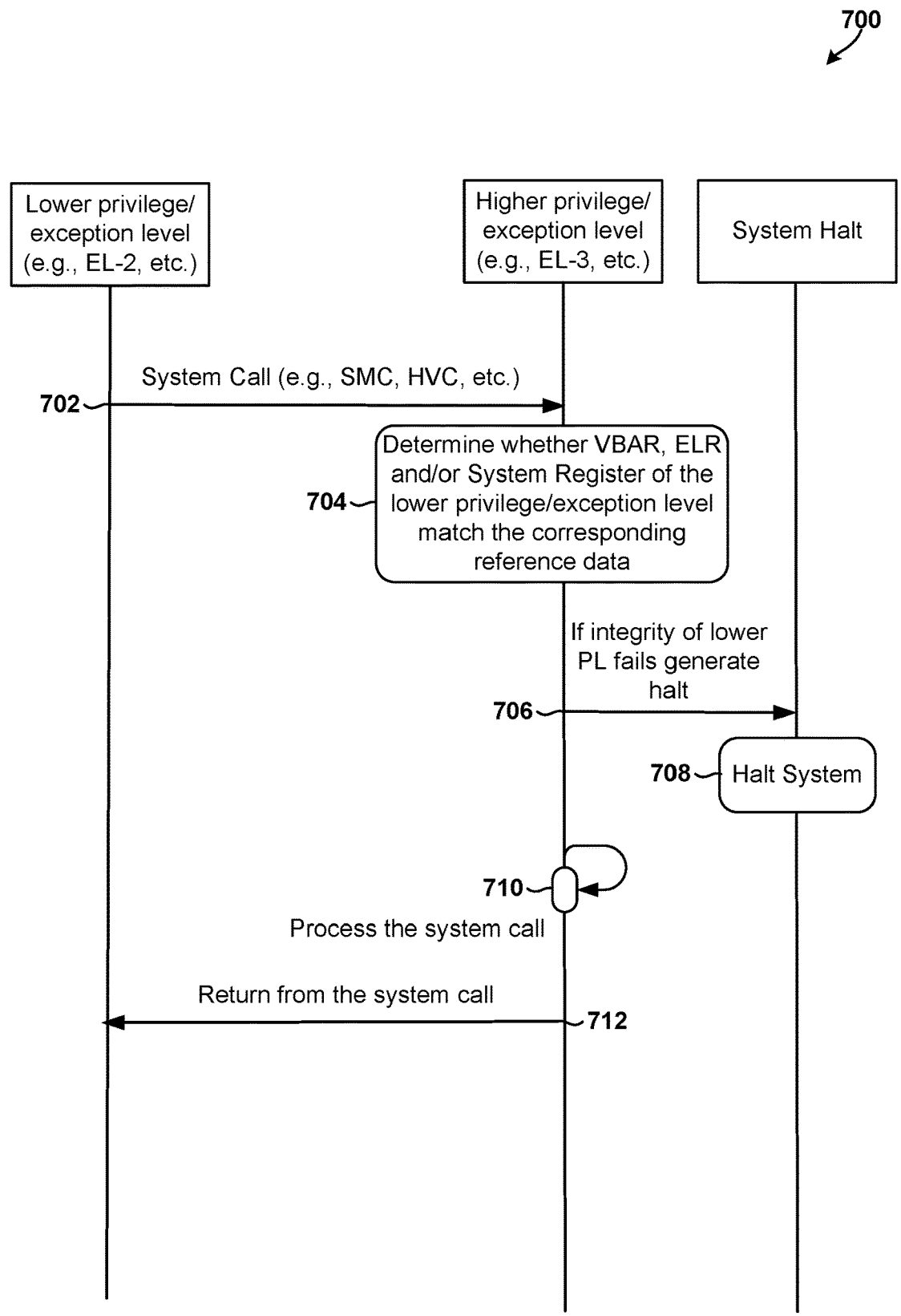
FIG. 7 is a message flow diagram illustrating operations, communications and interactions for processing system calls in a system that is configured to determine at runtime whether a software component has been corrupted or compromised in accordance with some embodiments.

FIG. 7 illustrates operations, communications and interactions in a system configured to perform a runtime method 700 for observing and evaluating whether a software component has been corrupted or compromised in accordance with some embodiments. With reference to FIGS. 1-7, the runtime method 700 may be performed by a processor (e.g., general-purpose processor 106, GPU, DSP, APU, etc.) in a computing device.

In operation 702, the LEL component or code executing at the lower privilege/exception level (e.g., EL-2, etc.) may issue a system call (e.g., SMC, HVC, etc.) to the HEL component or code executing at the higher privilege/exception level (e.g., EL-3, etc.). The "system calls" in operation 702 may include second stage data/instruction aborts that change control to high exception level and part of processor ISA instructions, or any core ISA mechanism to switch the privilege levels (e.g. user defined interrupts that may change the privilege level).

In block 704, the HEL component or code executing at the higher privilege/exception level (e.g., EL-3, etc.) may determine whether the values in the vector base address register (VBAR), exception link register (ELR, ELRx, etc.) or another system register (e.g., LEL control and system (LEL-CSR) register, etc.) of the LEL component or lower privilege/exception level code matches corresponding reference data.

If the values in the VBAR, ELR, and/or system register do not match their corresponding reference data for LEL component, the HEL component or code executing at the higher privilege/exception level (e.g., EL-3, etc.) may issue a system halt request to the system halt component in block 706, which may cause the system halt component halt the system in block 708.

If the values in the VBAR, ELR, and/or system register match their corresponding reference data, the HEL component or code executing at the higher privilege/exception level (e.g., EL-3, etc.) may process the system call as per normal operations in block 710.

In block 712, the HEL component or code executing at the higher privilege/exception level (e.g., EL-3, etc.) may respond to the system call and/or send the results of system call to the LEL component or code executing at the lower privilege/exception level (e.g., EL-2, etc.).

Figure 8:
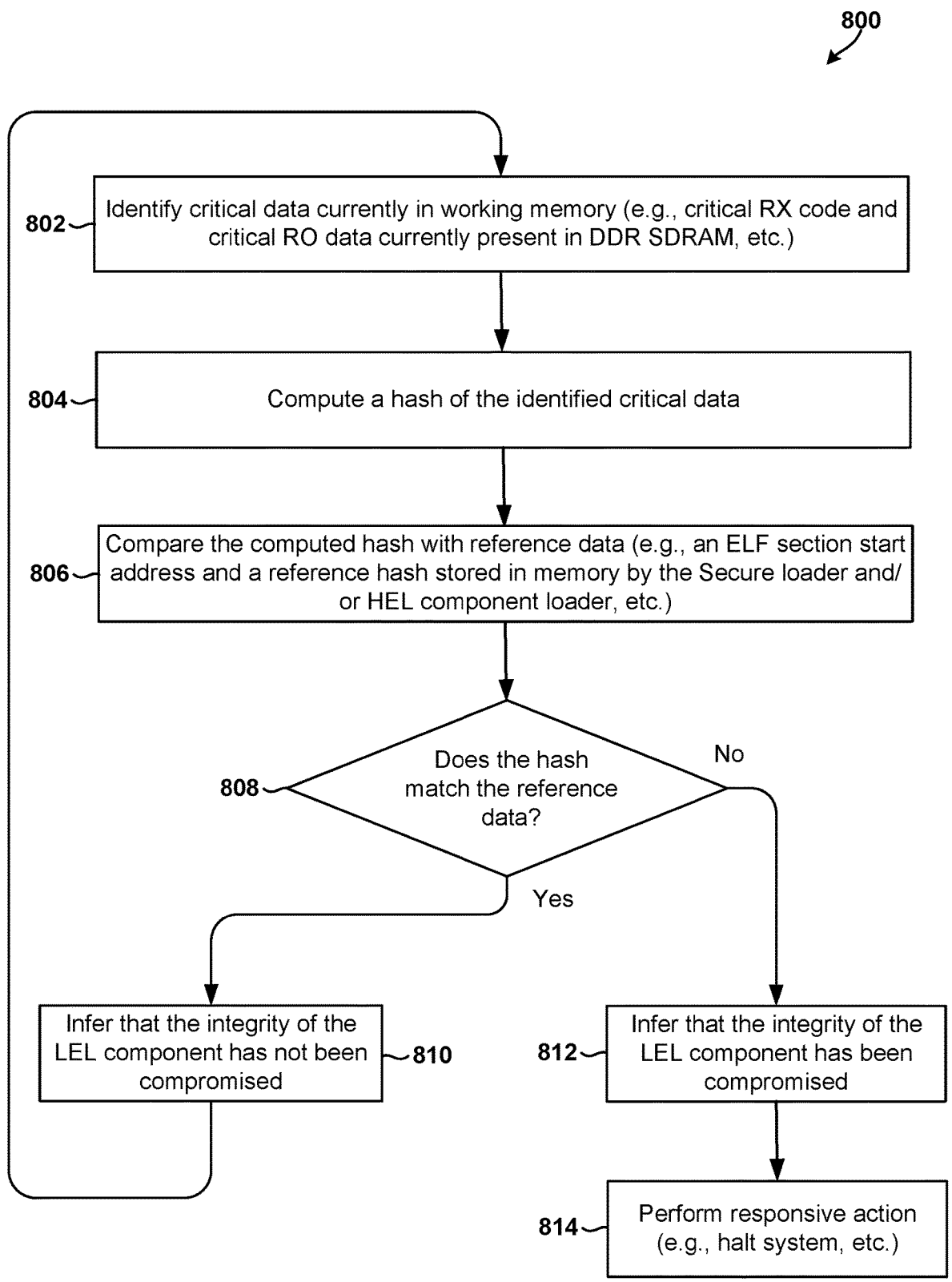
FIGS. 8-11 are process flow diagrams illustrating methods for evaluating the integrity of software components to determine whether they have been corrupted or compromised in accordance with various embodiments.

FIG. 8 illustrates a method 800 for by which a HEL component may evaluate the integrity of LEL components to determine whether the LEL components have been corrupted or compromised in accordance with some embodiments. With reference to FIGS. 1-8, the method 800 may be performed by a HEL component operating on a processor (e.g., general-purpose processor 106, GPU, DSP, APU, etc.) in a computing device.

In block 802, the HEL component may identify critical data currently in working memory. For example, the process may determine whether there are any critical RX code segments or critical RO data segments currently present in a DDR SDRAM of the computing device. Means for performing functions of block 802 may include a processor (e.g., 106) coupled to memory (e.g., 114).

In block 804, the HEL component may compute a hash of the identified critical data. For example, the processor may execute a hash function or operation on the critical data to generate hash values, hash codes, digests, or simply hashes that may be used to index to a hash table. Means for performing functions of block 804 may include a processor (e.g., 106) coupled to memory (e.g., 114).

In block 806, the HEL component may compare the computed hash with reference data. For example, the processor may compare the computed hash with an ELF section start address and/or a reference hash previously stored in memory by the XBL_SEC. Means for performing functions of block 806 may include a processor (e.g., 106) coupled to memory (e.g., 114).

In determination block 808, the HEL component may use the comparison results to determine whether the computed hash matches the corresponding reference data. For example, the computing device's core processor may compare the hashes for data in DDR and compare it with reference data, or may invoke crypto engines to compare the message digest with reference data. Means for performing functions of determination block 808 may include a processor (e.g., 106) coupled to memory (e.g., 114).

In response to determining that the computed hash matches the reference data (i.e., determination block 808="Yes"), the HEL component may infer, determine or verify that the integrity of the LEL component has not been compromised in block 810. In some embodiments, the HEL component may take no action, thus permitting the LEL component to continue running. In some embodiments, the HEL component may take an action as part of the operations in block 810 in response to determining or verifying that the integrity of the LEL component has not been compromised, such as setting a bit of flag in control and system register of LEL component that indicates to other functions (e.g., a hypervisor) that the LEL component has been verified and safe to continue executing. Means for performing functions of block 818 may include a processor (e.g., 106) coupled to memory (e.g., 114).

In response to determining that the computed hash does not match the reference data (i.e., determination block 808="No"), the HEL component may infer or determine that the integrity of the LEL component has been compromised in block 812 and perform a responsive action (e.g., halt system, etc.) in block 814. For example, the HEL component may issue/raise a "System Fatal" call/flag (e.g., in block 614 of the method 600). Means for performing functions of block 812 may include a processor (e.g., 106) coupled to memory (e.g., 114).

Figure 9:
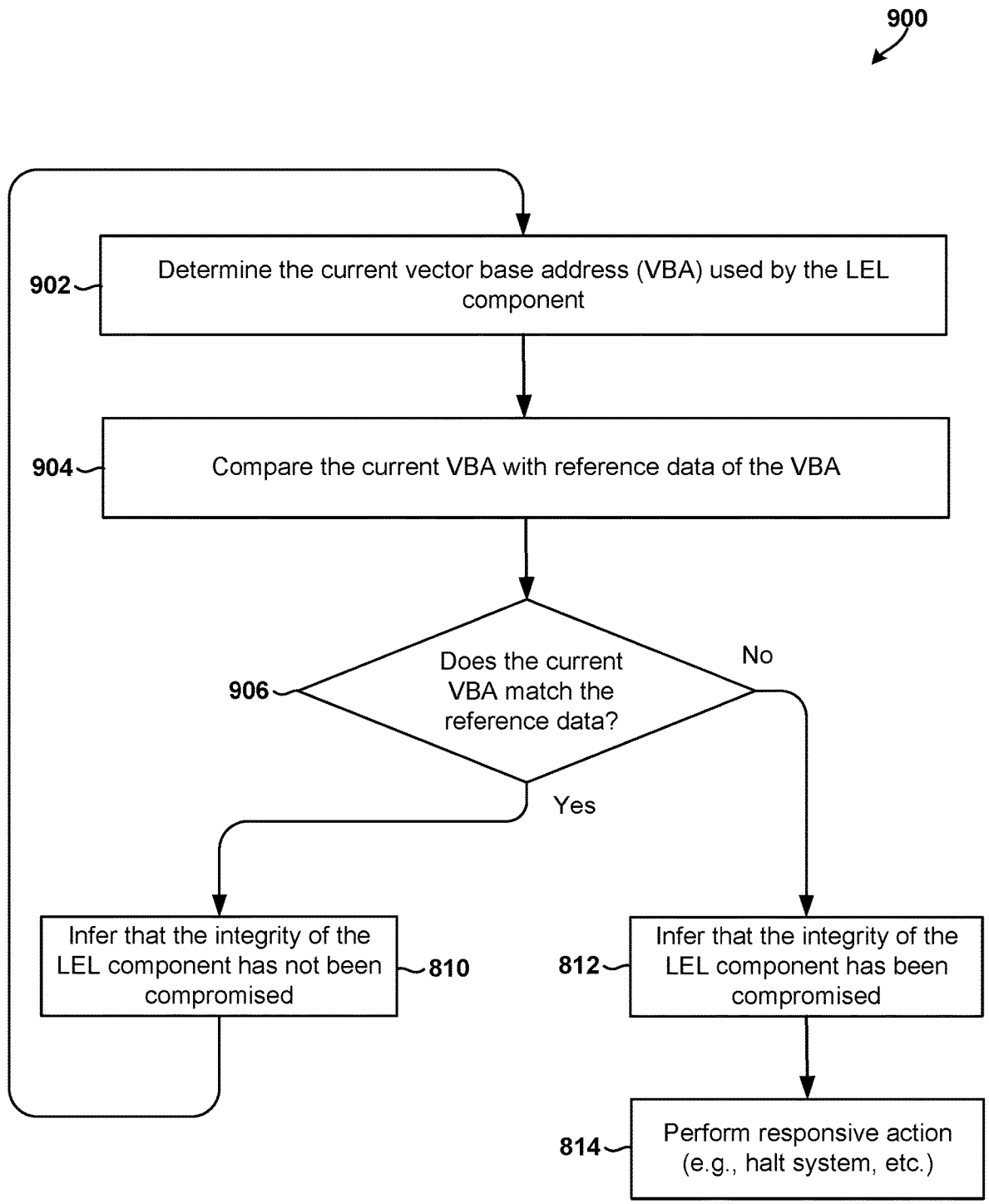

FIG. 9 illustrates a method 900 for evaluating the integrity of software components to determine whether they have been corrupted or compromised in accordance with some embodiments. With reference to FIGS. 1-9, the method 900 may be performed by a HEL component operating on a processor (e.g., general-purpose processor 106, GPU, DSP, APU, etc.) in a computing device.

In block 902, the HEL component may obtain or determine the current vector base address (VBA) used by the LEL component. That is, the HEL component has access to LEL component due to inherent higher privilege level attributes. As such, in block 902, the HEL component may identify the current VBA by reading a vector base address register (VBAR), reading a vector table base holder, reading exception level vector base address register (ELx_VBAR), reading a machine trap value register (MTVAL), or reading an event vector base (EVB). Means for performing functions of block 902 may include a processor (e.g., 106) coupled to memory (e.g., 114).

In block 904, the HEL component may compare the current VBA to corresponding reference data that was stored in HEL accessible memory during loading of the LEL component(s). For example, in block 904, the HEL component may compare the value of the VBAR, ELx_VBAR, MTVAL, or EVB to an address or range of addresses (e.g., ERI address ranges, etc.) in the reference data. The comparison operation may be range check or an equality operation of the address contained in VBAR. Means for performing functions of block 904 may include a processor (e.g., 106) coupled to memory (e.g., 114).

In determination block 906, the HEL component may determine whether the current VBA matches the corresponding reference data. Means for performing functions of determination block 906 may include a processor (e.g., 106) coupled to memory (e.g., 114).

In response to determining that current VBA matches the corresponding reference data (i.e., determination block 906="Yes"), the HEL component may determine or verify that the integrity of the LEL component has not been compromised in block 810 as described.

In response to determining that current VBA does not match the corresponding reference data (i.e., determination block 906="No"), the HEL component may infer or determine that the integrity of the LEL component has been compromised in block 812 as described, and perform a responsive action (e.g., halt system, etc.) in block 814 as described.

Figure 10:
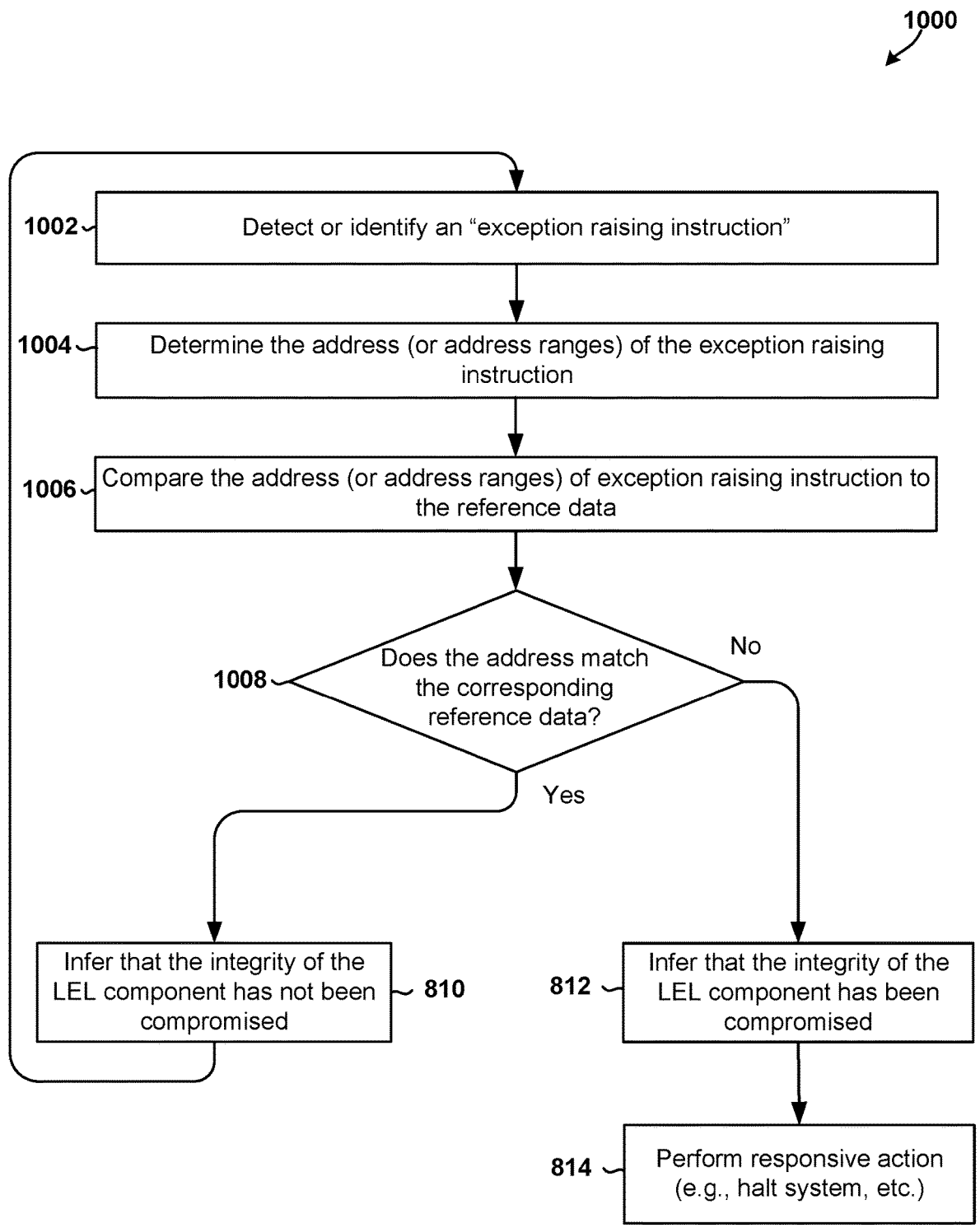

FIG. 10 illustrates a method 1000 for evaluating the integrity of LEL software components to determine whether they have been corrupted or compromised in accordance with some embodiments. With reference to FIGS. 1-10, the method 1000 may be performed by a HEL component operating on a processor (e.g., general-purpose processor 106, GPU, DSP, APU, etc.) in a computing device.

In blocks 1002 and 1004, the HEL component may detect or identify an exception raising instruction (ERI) and determine the address of the ERI or an ERI address range. For example, the HEL component may capture an address in the highest exception level from a secure monitor call (SMC) code section in LEL component by an exception link register (ELR), a machine exception program counter (MEPC), a program counter (PC) value for the instruction executed in LEL component when the exception occurred in processor control and status register. It should be understood that a single address may captured by the HEL component in blocks 1002 and 1004, and the reference data to which it is to be compared may include a range of addresses and/or a set of address ranges captured during secure cold boot. Means for performing functions of blocks 1102 and 1104 may include a processor (e.g., 106) coupled to memory (e.g., 114).

In block 1006, the HEL component may compare the determined ERI address (or ERI address ranges) to the reference data that was stored in HEL accessible memory during loading of the LEL component(s). Means for performing functions of block 1006 may include a processor (e.g., 106) coupled to memory (e.g., 114).

In determination block 1008, the HEL component may determine whether the ERI address (or ERI address ranges) matches corresponding reference data. Means for performing functions of determination block 1008 may include a processor (e.g., 106) coupled to memory (e.g., 114).

In response to determining that the ERI address (or ERI address ranges) matches the corresponding reference data (i.e., determination block 1008="Yes"), the HEL component may determine or verify that the integrity of the LEL component has not been compromised in block 810 as described with reference to FIG. 8.

In response to determining that the ERI address (or ERI address ranges) does not match the corresponding reference data (i.e., determination block 1008="No"), the HEL component may determine that the integrity of the LEL component has been compromised in block 812 as described with reference to FIG. 8, and perform a responsive action (e.g., halt system, etc.) in block 814 as described with reference to FIG. 8.

Figure 11:
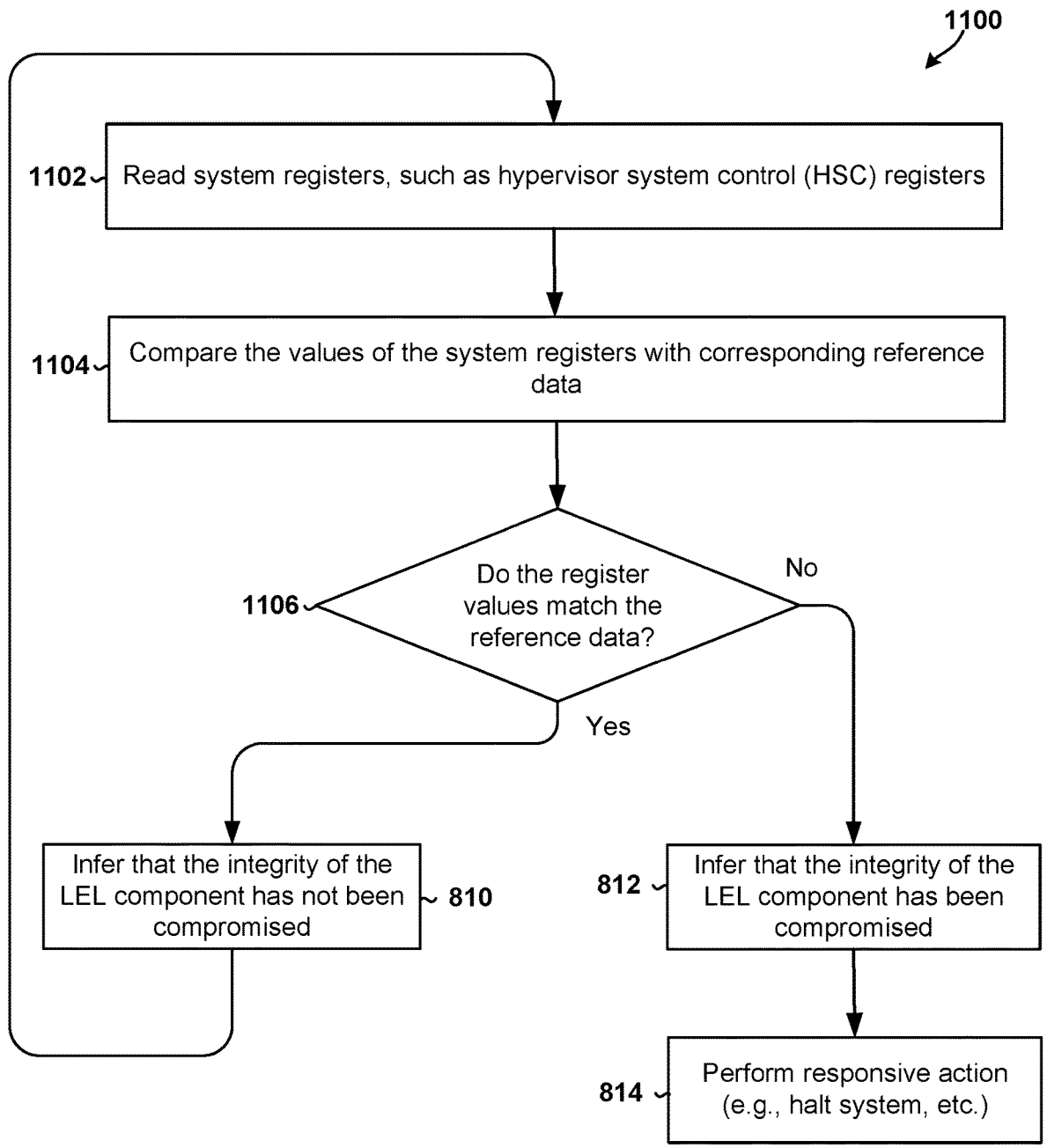

FIG. 11 illustrates a method 1100 for evaluating the integrity of software components to determine whether they have been corrupted or compromised in accordance with some embodiments. With reference to FIGS. 1-11, the method 1100 may be performed by a HEL component operating on a processor (e.g., general-purpose processor 106, GPU, DSP, APU, etc.) in a computing device.

In block 1102, the HEL component may read system registers, such as the LEL control and system (LEL-CSR) register. Means for performing functions of block 1102 may include a processor (e.g., 106) coupled to memory (e.g., 114).

In block 1104, the HEL component may compare the values of the control and system registers of LEL component (LEL-CSR) with corresponding reference data. Means for performing functions of block 1104 may include a processor (e.g., 106) coupled to memory (e.g., 114).

In determination block 1106, the HEL component may determine whether the register values match corresponding reference data. For example, the HEL component may perform a comparison operation to whether captured address falls within the reference address ranges. Means for performing functions of determination block 1106 may include a processor (e.g., 106) coupled to memory (e.g., 114).

In response to determining that the register values match corresponding reference data (i.e., determination block 1106="Yes"), the HEL component may determine or verify that the integrity of the LEL component has not been compromised in block 810 as described with reference to FIG. 8.

In response to determining that the register values do not match corresponding reference data (i.e., determination block 1106="No"), the HEL component may determine that the integrity of the LEL component has been compromised in block 812 as described with reference to FIG. 8, and perform a responsive action (e.g., halt system, etc.) in block 814 as described with reference to FIG. 8.

Figure 12:
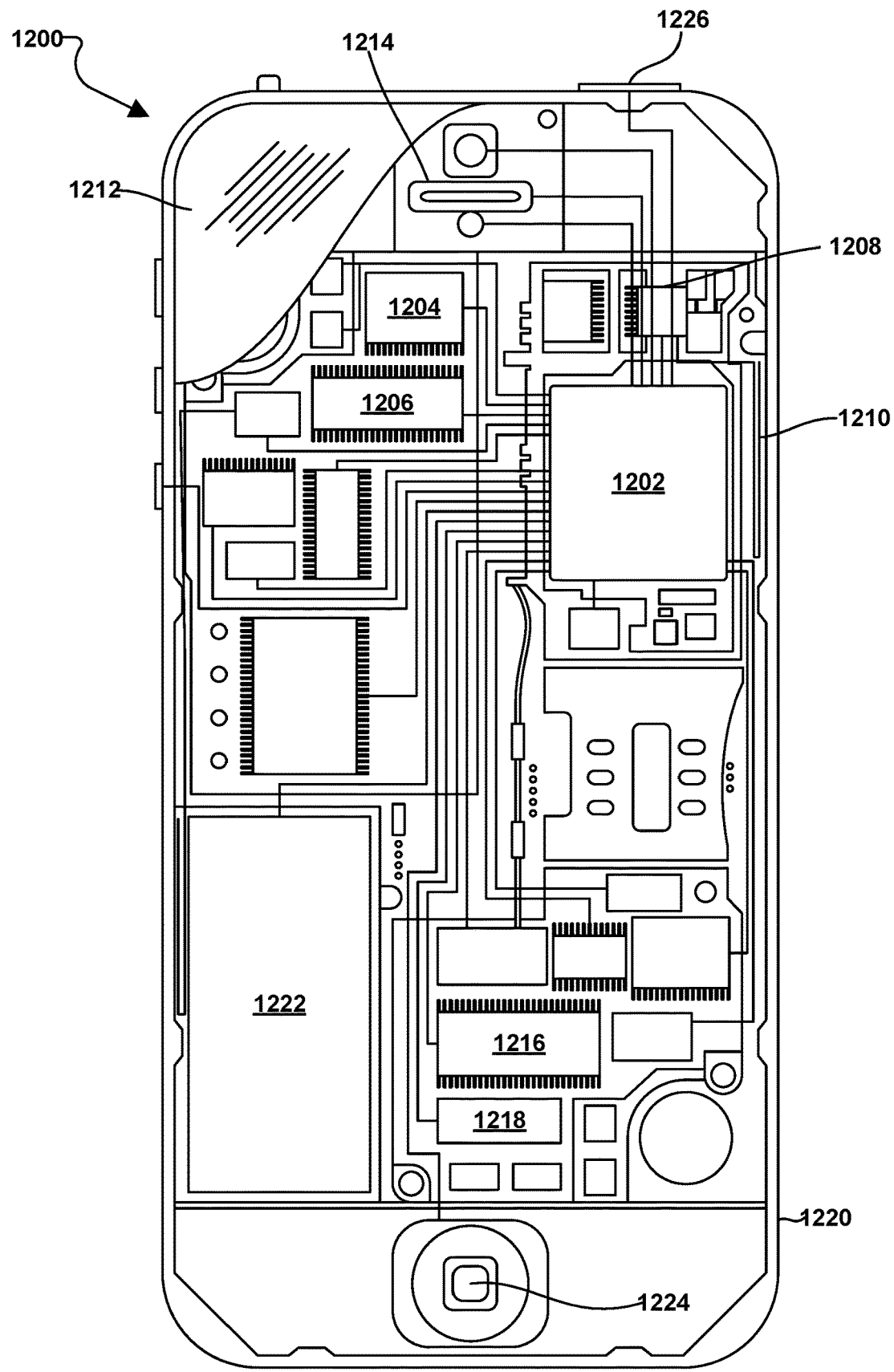
FIG. 12 is a component block diagram illustrating a computing device in the form of a wireless communication device suitable for implementing some embodiments.

Various embodiments (including, but not limited to, embodiments described above with reference to FIGS. 1-11) may be implemented in a wide variety of computing systems including wireless communication devices, an example of which suitable for use with various embodiments is illustrated in FIG. 12. The wireless communication device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory and may also be secure and/or encrypted memory, or unsecure and/or unencrypted memory, or any combination thereof. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the computing device 1200 need not have touch screen capability.

The wireless communication device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The wireless communication device 1200 may include a cellular network wireless modem chip 1216 that enables communication via a cellular network and is coupled to the processor.

The wireless communication device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The wireless communication device 1200 may also include speakers 1214 for providing audio outputs. The wireless communication device 1200 may also include a housing 1220, constructed of a plastic, metal, or a combination of materials, for containing all or some of the components described herein. The wireless communication device 1200 may include a power source 1222 coupled to the processor 1202, such as a disposable or rechargeable battery. The rechargeable battery may also be coupled to the peripheral device connection port to receive a charging current from a source external to the wireless communication device 1200. The wireless communication device 1200 may also include a physical button 1224 for receiving user inputs. The wireless communication device 1200 may also include a power button 1226 for turning the wireless communication device 1200 on and off.

Figure 13:
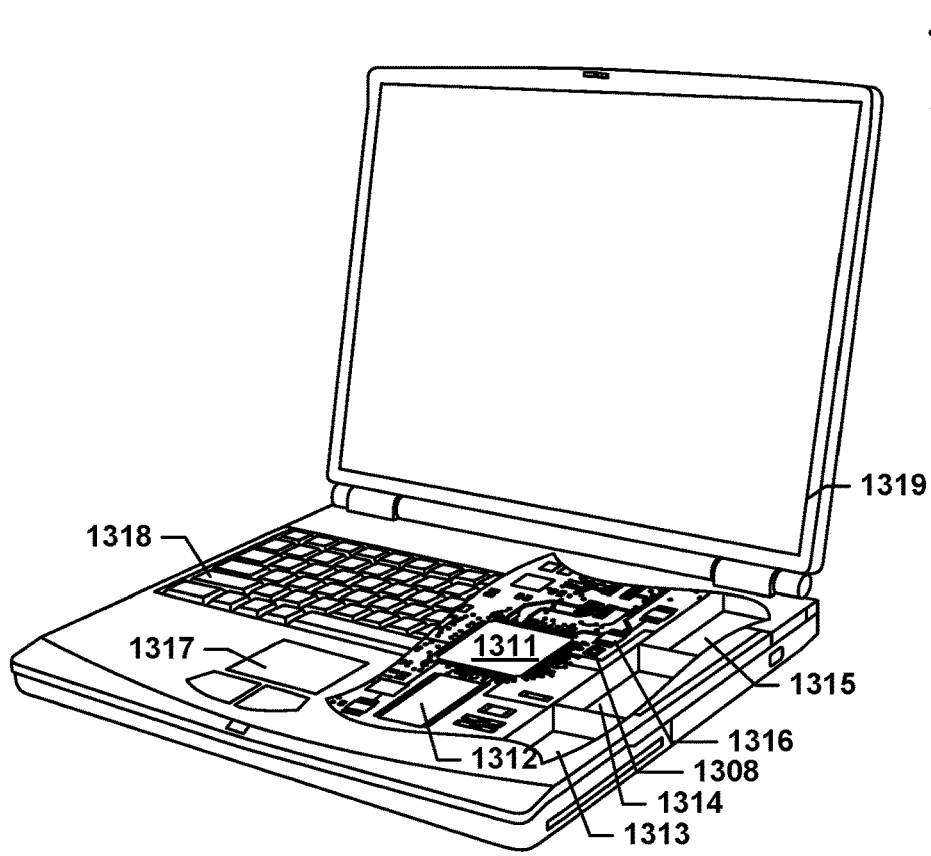
FIG. 13 is a component block diagram illustrating a computing device in the form of a laptop suitable for implementing some embodiments.

Various embodiments (including, but not limited to, embodiments described above with reference to FIGS. 1-11) may be implemented in a wide variety of computing devices include a laptop computer 1300 an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with various embodiments.

Figure 14:
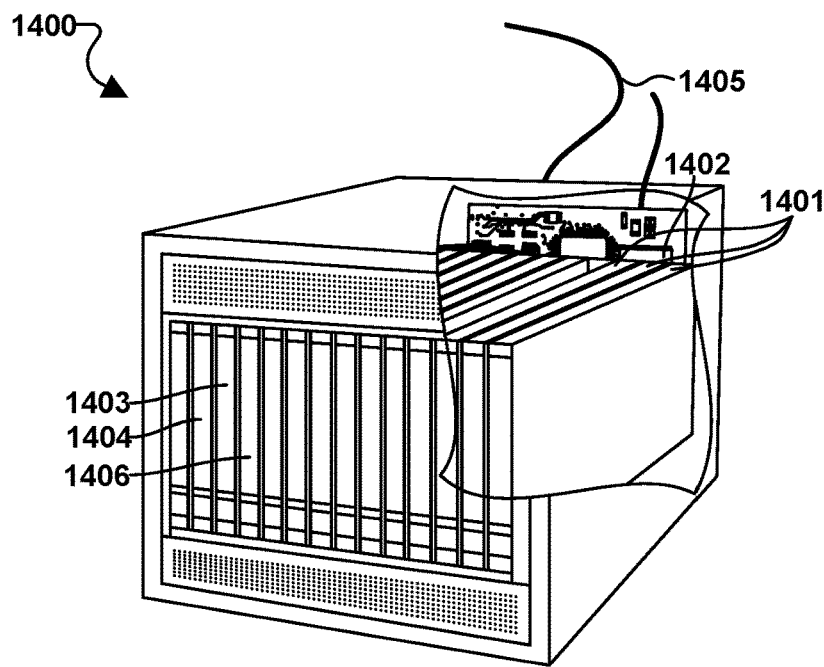
FIG. 14 is a component block diagram illustrating a server computing device suitable for implementing some embodiments.

Various embodiments (including, but not limited to, embodiments described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Computer program code or "program code" for execution on a programmable processor for carrying out operations of various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with various embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to various embodiments and implementations described herein, but is to be accorded the widest scope consistent with the following claims and the principles and novel features disclosed herein.

What is claimed is:

1. A method of evaluating software operating on a computing device at a lower exception level, comprising:
    storing, by a component operating at a higher exception level ("HEL component"), reference data in a portion of memory that is accessible to the HEL component but not to a component operating at a lower exception level ("LEL component");
    identifying, by the HEL component, at least one of a current vector base address (VBA) or a control and system register (CSR) value used by the LEL component;
    determining whether at least one of the current VBA or the CSR value used by the LEL component match the reference data stored in the portion of memory that is accessible to the HEL component but not to the LEL component; and
    performing a responsive action in response to determining that the current VBA or CSR value used by the LEL component does not match the reference data stored in the portion of memory that is accessible to the HEL component but not to the LEL component.

2. The method of claim 1, further comprising:
    scanning, by the HEL component, the lower exception level to collect data;
    labeling portions of the collected data as critical data that is to be used as reference data;
    generating hashes of the reference data; and
    storing the generated hashes as the reference data in the portion of the memory that is accessible to the HEL component but not to the LEL component.

3. The method of claim 2, wherein scanning, by the HEL component,
    the lower exception level to collect data comprises the HEL component collecting LEL component data as reference data during loading of LEL the component.

4. The method of claim 1, further comprising:
    identifying critical data currently in working memory;
    computing a hash of the identified critical data; and
    comparing the computed hash with the reference data stored in the portion of memory that is accessible to the HEL component but not to the LEL component to determine whether at least one of the current VBA or the system register value match the reference data stored in the portion of memory that is accessible to the HEL component but not to the LEL component.

5. The method of claim 4, wherein:
    identifying critical data currently in working memory comprises identifying critical read-execute (RX) code or critical read only (RO) data currently present in working memory; and
    comparing the computed hash with the reference data stored in the portion of memory that is accessible to the HEL component but not to the LEL component comprises comparing the computed hash with reference data hash stored in memory by HEL component.

6. The method of claim 1, further comprising:
   invoking the HEL component periodically to verify that the integrity of the LEL component has not been compromised.

7. The method of claim 1, further comprising:
   invoking the HEL component non-periodically to verify that the integrity of the LEL component has not been compromised.

8. The method of claim 1, further comprising invoking the HEL component periodically to verify that the integrity of the LEL component has not been compromised by invoking the HEL component based on at least one of:
   a machine interrupt with a cyclic executive trigger;
   a random machine interrupt with a pseudo random table-driven trigger; or
   a user triggered machine interrupt with an event-based trigger.

9. The method of claim 1, further comprising:
   detecting a system call or runtime event that could cause a change in a current exception level of the computing device; and
   invoking the HEL component to verify that the integrity of the LEL component has not been compromised in response to detecting the system call or runtime event that could cause the change in the current exception level of the computing device.

10. The method of claim 1, wherein identifying at least one of the current VBA or the CSR value used by the LEL component comprises identifying the current VBA by performing one or more of:
    reading a vector base address register (VBAR);
    reading a vector table base holder;
    reading exception level vector base address register (ELx_VBAR);
    reading a machine trap value register (MTVAL); or
    reading an event vector base (EVB).

11. The method of claim 1, wherein determining whether at least one of the current VBA or the CSR value match the reference data stored in the portion of memory that is accessible to the HEL component but not to the LEL component comprises using a reference data comparison set that includes:
    a hash of a critical section;
    a VBA; or
    a CSR value.

12. A computing device, comprising:
    a processor configured to:
      storing, by a component operating at a higher exception level ("HEL component"), reference data in a portion of memory that is accessible to the HEL component but not to a component operating at a lower exception level ("LEL component");
      identify, by the HEL component, at least one of a current vector base address (VBA) or a control and system register (CSR) value used by the LEL component;
      determine whether at least one of the current VBA or the CSR value used by the LEL component match the reference data stored in the portion of memory that is accessible to the HEL component but not to the LEL component; and
      perform a responsive action in response to determining that the current VBA or CSR value used by the LEL component does not match the reference data stored in the portion of memory that is accessible to the HEL component but not to the LEL component.

13. The computing device of claim 12, wherein the processor is further configured to:
    scan, by the HEL component, the lower exception level to collect data;
    label portions of the collected data as critical data that is to be used as reference data;
    generate hashes of the reference data; and
    store the generated hashes as the reference data in the portion of the memory that is accessible to the HEL component but not to the LEL component.

14. The computing device of claim 13, wherein the processor is configured to scan the lower exception level to collect data by causing the HEL component to collect LEL component data as reference data during loading of LEL the component.

15. The computing device of claim 12, wherein the processor is further configured to:
    identify critical data currently in working memory;
    compute a hash of the identified critical data; and
    compare the computed hash with the reference data stored in the portion of memory that is accessible to the HEL component but not to the LEL component to determine whether at least one of the current VBA or the system register value match the reference data stored in the portion of memory that is accessible to the HEL component but not to the LEL component.

16. The computing device of claim 15, wherein the processor is configured to:
    identify the critical data currently in the working memory by identifying critical read-execute (RX) code or critical read only (RO) data currently present in the working memory; and
    compare the computed hash with the reference data stored in the portion of memory that is accessible to the HEL component but not to the LEL component by comparing the computed hash with reference data hash stored in memory by HEL component.

17. The computing device of claim 12, wherein the processor is further configured to:
    invoke the HEL component periodically to verify that the integrity of the LEL component has not been compromised.

18. The computing device of claim 12, wherein the processor is further configured to:
    invoke the HEL component non-periodically to verify that the integrity of the LEL component has not been compromised.

19. The computing device of claim 12, wherein the processor is configured to invoke the HEL component periodically to verify that the integrity of the LEL component has not been compromised by invoking the HEL component based on at least one of:
    a machine interrupt with a cyclic executive trigger;
    a random machine interrupt with a pseudo random table-driven trigger; or
    a user triggered machine interrupt with an event-based trigger.

20. The computing device of claim 12, wherein the processor is further configured to:
    detect a system call or runtime event that could cause a change in a current exception level of the computing device; and
    invoke the HEL component to verify that the integrity of the LEL component has not been compromised in response to detecting the system call or runtime event that could cause the change in the current exception level of the computing device.

21. The computing device of claim 12, wherein the processor is configured to identify at least one of the current VBA or the CSR value used by the LEL component by identifying the current VBA by being configured to:
   read a vector base address register (VBAR);
   read a vector table base holder;
   read exception level vector base address register (ELx_VBAR);
   read a machine trap value register (MTVAL); or
   read an event vector base (EVB).

22. The computing device of claim 12, wherein the processor is configured to determine whether at least one of the current VBA or the CSR value match the reference data stored in the portion of memory that is accessible to the HEL component but not to the LEL component by using a reference data comparison set that includes:
   a hash of a critical section;
   a VBA;
   a set of address ranges for ERI captured from an exception link register (ELR) or a machine exception program counter (MEPC); or
   a CSR value.

23. A non-transitory processor-readable medium having stored thereon processor-executable instructions configured cause a processor of a computing device to perform operations comprising:
   storing, by a component operating at a higher exception level ("HEL component"), reference data in a portion of memory that is accessible to the HEL component but not to a component operating at a lower exception level ("LEL component");
   identifying, by the HEL component, at least one of a current vector base address (VBA) or a control and system register (CSR) value used by the LEL component;
   determining whether at least one of the current VBA or the CSR value used by the LEL component match the reference data stored in the portion of memory that is accessible to the HEL component but not to the LEL component; and
   performing a responsive action in response to determining that the current VBA or CSR value used by the LEL component does not match the reference data stored in the portion of memory that is accessible to the HEL component but not to the LEL component.

24. The non-transitory processor-readable medium of claim 23, wherein the stored processor-executable instructions are configured to cause a processor of a computing device to perform operations further comprising:
   scanning, by the HEL component, the lower exception level to collect data;
   labeling portions of the collected data as critical data that is to be used as reference data;
   generating hashes of the reference data; and
   storing the generated hashes as the reference data in the portion of the memory that is accessible to the HEL component but not to the LEL component.

25. The non-transitory processor-readable medium of claim 24, wherein the stored processor-executable instructions are configured to cause a processor of a computing device to perform operations such that scanning, by the HEL component, the lower exception level to collect data comprises the HEL component collecting LEL component data as reference data during loading of LEL the component.

26. The non-transitory processor-readable medium of claim 23, wherein the stored processor-executable instructions are configured to cause a processor of a computing device to perform operations further comprising:
   identifying critical data currently in working memory;
   computing a hash of the identified critical data; and
   comparing the computed hash with the reference data stored in the portion of memory that is accessible to the HEL component but not to the LEL component to determine whether at least one of the current VBA or the system register value match the reference data stored in the portion of memory that is accessible to the HEL component but not to the LEL component.

27. The non-transitory processor-readable medium of claim 26, wherein the stored processor-executable instructions are configured to cause a processor of a computing device to perform operations such that:
   identifying critical data currently in working memory comprises identifying critical read-execute (RX) code or critical read only (RO) data currently present in working memory; and
   comparing the computed hash with the reference data stored in the portion of memory that is accessible to the HEL component but not to the LEL component comprises comparing the computed hash with reference data hash stored in memory by HEL component.

28. The non-transitory processor-readable medium of claim 23, wherein the stored processor-executable instructions are configured to cause a processor of a computing device to perform operations further comprising:
   invoking the HEL component periodically to verify that the integrity of the LEL component has not been compromised.

29. The non-transitory processor-readable medium of claim 23, wherein the stored processor-executable instructions are configured to cause a processor of a computing device to perform operations further comprising:
   invoking the HEL component non-periodically to verify that the integrity of the LEL component has not been compromised.

30. The non-transitory processor-readable medium of claim 23, wherein the stored processor-executable instructions are configured to cause a processor of a computing device to perform operations further comprising invoking the HEL component periodically to verify that the integrity of the LEL component has not been compromised by invoking the HEL component based on at least one of:
   a machine interrupt with a cyclic executive trigger;
   a random machine interrupt with a pseudo random table-driven trigger; or
   a user triggered machine interrupt with an event-based trigger.

31. The non-transitory processor-readable medium of claim 23, wherein the stored processor-executable instructions are configured to cause a processor of a computing device to perform operations further comprising:
   detecting a system call or runtime event that could cause a change in a current exception level of the computing device; and
   invoking the HEL component to verify that the integrity of the LEL component has not been compromised in response to detecting the system call or runtime event that could cause the change in the current exception level of the computing device.

32. The non-transitory processor-readable medium of claim 23, wherein the stored processor-executable instructions are configured to cause a processor of a computing device to perform operations such that identifying at least one of the current VBA or the CSR value used by the LEL component comprises identifying the current VBA by performing one or more of:
   reading a vector base address register (VBAR);
   reading a vector table base holder;
   reading exception level vector base address register (ELx_VBAR);
   reading a machine trap value register (MTVAL); or
   reading an event vector base (EVB); or
   equivalent provisions in hierarchical privilege level-based instruction set architectures.

33. The non-transitory processor-readable medium of claim 23, wherein the stored processor-executable instructions are configured to cause a processor of a computing device to perform operations such that determining whether at least one of the current VBA or the CSR value match the reference data stored in the portion of memory that is accessible to the HEL component but not to the LEL component comprises using a reference data comparison set that includes:
   a hash of a critical section;
   a VBA;
   a set of address ranges for ERI captured from an exception link register (ELR) or a machine exception program counter (MEPC); or
   a CSR value.

\* \* \* \* \*